United States Patent
Kawai et al.

(10) Patent No.: US 7,435,020 B2
(45) Date of Patent: *Oct. 14, 2008

(54) DIGITAL CAMERA SYSTEM, CAMERA BODY OF DIGITAL CAMERA, AND INTERCHANGEABLE LENS

(75) Inventors: Sumio Kawai, Hachioji (JP); Yasuzi Ogata, Tokyo (JP)

(73) Assignee: Olympus Corporation, Tokyo (JP)

(*) Notice: Subject to any disclaimer, the term of this patent is extended or adjusted under 35 U.S.C. 154(b) by 618 days.

This patent is subject to a terminal disclaimer.

(21) Appl. No.: 11/125,428

(22) Filed: May 10, 2005

(65) Prior Publication Data
US 2005/0200743 A1  Sep. 15, 2005

Related U.S. Application Data

(63) Continuation of application No. 10/465,410, filed on Jun. 19, 2003, now Pat. No. 6,910,814.

(30) Foreign Application Priority Data
Jun. 12, 2003  (JP) ............................. 2003-168383

(51) Int. Cl.
 *G03B 17/02*  (2006.01)
(52) U.S. Cl. ................... 396/529; 396/535; 348/360; 348/376
(58) Field of Classification Search .......... 396/529, 396/535; 348/294, 335, 373, 376
See application file for complete search history.

(56) References Cited

U.S. PATENT DOCUMENTS

| | | | |
|---|---|---|---|
| 4,733,258 A | 3/1988 | Kojima et al. | |
| 5,381,176 A | 1/1995 | Tanabe et al. | |
| 6,463,222 B1 | 10/2002 | Ito et al. | |
| 6,742,943 B2 | 6/2004 | Ushiro | |
| 6,910,814 B2 * | 6/2005 | Kawai et al. | 396/529 |
| 2002/0025164 A1 | 2/2002 | Satoshi | |

FOREIGN PATENT DOCUMENTS

| | | |
|---|---|---|
| EP | 0 541449 A2 | 5/1993 |
| JP | 05 130 469 | 5/1993 |
| JP | 06 037 289 | 2/1994 |
| JP | 11 088 783 | 3/1999 |

(Continued)

*Primary Examiner*—W. B. Perkey
(74) *Attorney, Agent, or Firm*—Volpe and Koenig P.C.

(57) ABSTRACT

A camera system according to the present invention includes an image pickup device having an imaging surface of an imaging range with a predetermined aspect ratio, the image circle being set larger than the imaging range to include the imaging range therein, a mount portion to which the interchangeable lens is mounted, and an opening portion having an opening for allowing luminous flux from the interchangeable lens to pass through, being located at a position spaced from the imaging surface by a predetermined distance, wherein the size of the opening of the opening portion is equal to or larger than a square formed by connecting ends of segments tilted by an angle θ with respect to an optical axis diagonally from four corners of the imaging range and extended to the opening of the opening portion, and the angle θ satisfies:

12 degrees ≦ θ, wherein a distance between the opening of the opening portion and the imaging surface, herein referred to as flange back (FB), is:

35 mm ≦ FB ≦ 50 mm.

18 Claims, 14 Drawing Sheets

FOREIGN PATENT DOCUMENTS

| | | |
|---|---|---|
| JP | 2000 196953 | 7/2000 |
| JP | 2001-59988 | 3/2001 |
| JP | 2003 158 666 | 5/2003 |
| JP | 2003 134390 | 5/2003 |
| JP | 2003-134390 | 5/2003 |
| JP | 2003-158666 | 5/2003 |

* cited by examiner

DIGITAL CAMERA SYSTEM, CAMERA BODY OF DIGITAL CAMERA, AND INTERCHANGEABLE LENS

This application claims benefits of copending application Ser. No. 10/465,410 filed Jun. 19, 2003 and Japanese Application No. 2003-168383 filed in Japan on Jun. 12, 2003, the contents of which are incorporated by this reference.

BACKGROUND OF THE INVENTION

1. Field of the Invention

The present invention relates to a digital camera system having an interchangeable lens and a camera body to which the interchangeable lens can be attached.

2. Related Art Statement

An image pickup device in a recent digital camera has a narrow dynamic range. Furthermore, it is difficult to receive and performs photoelectric conversion on light emitted diagonally at a predetermined angle or larger. Therefore, the influence of the decrease in amount of peripheral light is more significant than a silver halide camera. In order to solve the problem, Japanese Unexamined Patent Application Publication No. 6-37289 discloses a technology for increasing an opening diameter of a micro-lens on the periphery of an image pickup device. According to the disclosed technology, the opening diameter of a micro-lens of an image pickup device is increased continuously toward the periphery.

In order to reduce the influence of the decrease in amount of peripheral light, Japanese Unexamined Patent Application Publication No. 5-130469 discloses a technology for forming a light path of an image pickup device such that the vignetting of a light beam can be prevented in a light path from a photographic lens to the image pickup device. A video camera disclosed in the patent document has a larger opening in an image frame plate so as to prevent vignetting, and the strength of the image frame plate in a diagonal direction of the opening is reinforced by a projection.

On the other hand, a lens interchangeable, single-lens reflex type digital camera system has been disclosed. For example, an electronic camera disclosed in Japanese Unexamined Patent Application Publication No. 11-88783 relates to a single-lens reflex type electronic camera having a solid-state imaging device such as a CCD in a film opening by using the body of a conventional silver halide camera.

SUMMARY OF THE INVENTION

A camera system according to the present invention includes an image pickup device having an imaging surface of an imaging range with a predetermined aspect ratio, the image circle being set larger than the imaging range to include the imaging range therein, a mount portion to which the interchangeable lens is mounted, and an opening portion having an opening for allowing luminous flux from the interchangeable lens to pass through, being located at a position spaced from the imaging surface by a predetermined distance, wherein the size of the opening of the opening portion is equal to or larger than a square formed by connecting ends of segments tilted by an angle θ with respect to an optical axis diagonally from four corners of the imaging range and extended to the opening of the opening portion, and the angle θ satisfies:

12 degrees ≦θ, wherein a distance between the opening of the opening portion and the imaging surface, herein referred to as flange back (FB), is:

35 mm≦FB≦50 mm

A digital camera system and camera body for use with an interchangeable lens is disclosed. The digital camera system includes an interchangeable lens having a predetermined image circle and a lens side mount portion for attaching the interchangeable lens to a camera body and a lens side opening portion provided in the lens mount portion through which luminous flux can pass for forming an image in the image circle and allowing the forming of an image in the image circle, and a camera body having an image pickup device having an imaging range with a given aspect ratio of 4:3 on an imaging surface within the image circle, a body side mount portion located at a position apart from the imaging surface by a predetermined distance and a body side opening portion provided in the body side mount portion for allowing luminous flux from the interchangeable lens to pass through. In this case, the size of the body side opening portion is equal to or larger than the square formed by connecting ends of segments tilted by an angle θ with respect to an optical axis diagonally from four corners of the imaging range and extended to the body side opening portion, and the angle θ satisfies:

12 degrees≦θ.

A camera body according to the present invention of a digital camera to which an interchangeable lens is removably mounted, includes an image pickup device having an imaging surface of an imaging range with a predetermined aspect ratio, and a mount portion to which the interchangeable lens is mounted, the mount portion having an opening portion for allowing luminous flux from the interchangeable lens to pass through, being located at a position apart from the imaging surface by a predetermined distance. In this case, the size of the opening portion is equal to or larger than the square formed by connecting ends of segments tilted by an angle θ with respect to an optical axis diagonally from four corners of the imaging range and extended to the opening portion, and the angle θ satisfies:

12 degrees≦θ.

Another digital camera system according to the present invention has a predetermined image circle. The digital camera system includes an interchangeable lens, which can form an image within the image circle, the lens having a lens side mount portion for mounting the interchangeable lens to a camera body and a lens side opening portion provided in the lens side mount portion for allowing luminous flux for forming an image in the image circle to pass through, and a camera body having an image pickup device having an imaging surface, a body side mount portion provided at a position apart from the imaging surface by a predetermined distance, and a body side opening portion provided in the body side mount portion, for allowing luminous flux from the interchangeable lens to pass through. In this case, the body side opening portion satisfies:

Dm/Di≧1.8 where the minimum circle diameter including the opening portion is Dm and the diameter of the image circle is Di.

A digital camera body according to the invention to which an interchangeable lens having a predetermined image circle can be removably mounted is provided, the digital camera body including an image pickup device having an imaging surface of an imaging range with a predetermined aspect ratio, a mount portion to which the interchangeable lens is mounted, the mount portion being located at a position apart from the imaging surface by a predetermined distance, and an opening portion provided in the mount portion, for allowing luminous flux from the interchangeable lens to pass through. In this case, the size of the opening portion is equal to or larger than the circumscribed circle of the square formed by connecting ends of segments tilted by a predetermined angle with respect to an optical axis diagonally from four corners of the imaging range and extended to the opening portion and satisfies:

$$Dm/D \geq 1.8$$

where the minimum circle diameter including the opening portion is Dm and the diameter of the image circle is Di.

An interchangeable lens according to the present invention is removably mounted to a digital camera body. The interchangeable lens includes a mount portion for mounting to the digital camera body, and an opening portion provided in the mount portion, for allowing luminous flux to pass through. In this case, $$Dml/Dc \geq 1.8$$

is satisfied where the diameter of the circumscribed diameter of the imaging range of the digital camera body is Dc and the minimum circle diameter including the opening portion is Dml.

Another digital camera system according to the present invention has a predetermined image circle. The digital camera system includes interchangeable lenses, which can form an image within the image circle, each of the lenses having a lens side mount portion for mounting the interchangeable lens to a camera body, and a lens side opening portion provided in the lens side mount portion for allowing luminous flux for forming an image within the image circle to pass through, and a camera body having an image pickup device having an imaging range with the aspect ratio of 4:3 on an imaging surface within the image circle, a body side mount portion provided at a position apart from the imaging surface by a predetermined distance and a body side opening portion provided in the mount portion for allowing luminous flux from the interchangeable lens to pass through. In this case, the lens side opening portion of an interchangeable lens having the widest outermost light beam of an exit luminous flux among the interchangeable lenses has a size equal to or larger than the size of the square formed by connecting ends of a first plane formed by tilting the long side of the imaging range by a predetermined angle θ1 apart with respect to an optical axis and extending the long side to the lens side opening portion and a second plane formed by tilting the short side of the imaging range by a predetermined angle θ2 apart with respect to the optical axis and extending the short side to the lens side opening portion. In this case, the angles θ1 and θ2 satisfy:

10 degrees $\leq$ θ1 and 8 degrees $\leq$ θ2.

Another digital camera according to the present invention has a predetermined image circle. An interchangeable lens, which can form an image within a given image circle, can be removably mounted to the mount portion of the camera body. An opening portion having an opening for allowing luminous flux from the interchangeable lenses to pass through is located a predetermined distance from an image surface of an image pickup device in the camera body, the image pickup device having an imaging range with a predetermined aspect ratio. The size of the opening of the opening portion is equal to or larger than the size of a square formed by connecting ends of segments tilted outwardly by an angle θ with respect to an optical axis and extending to the opening of the opening portion, wherein the angle θ is given by θ $\geq$ 12 degrees and the distance between the opening of the opening portion and the image surface, herein referred to as flange back (FB), is:

35 mm $\leq$ FB $\leq$ 50 mm

The other features and advantages of the present invention will be apparent from descriptions below.

DETAILED DESCRIPTION OF PREFERRED EMBODIMENTS

Embodiments of the invention will be described with reference to drawings.

Figure 1:
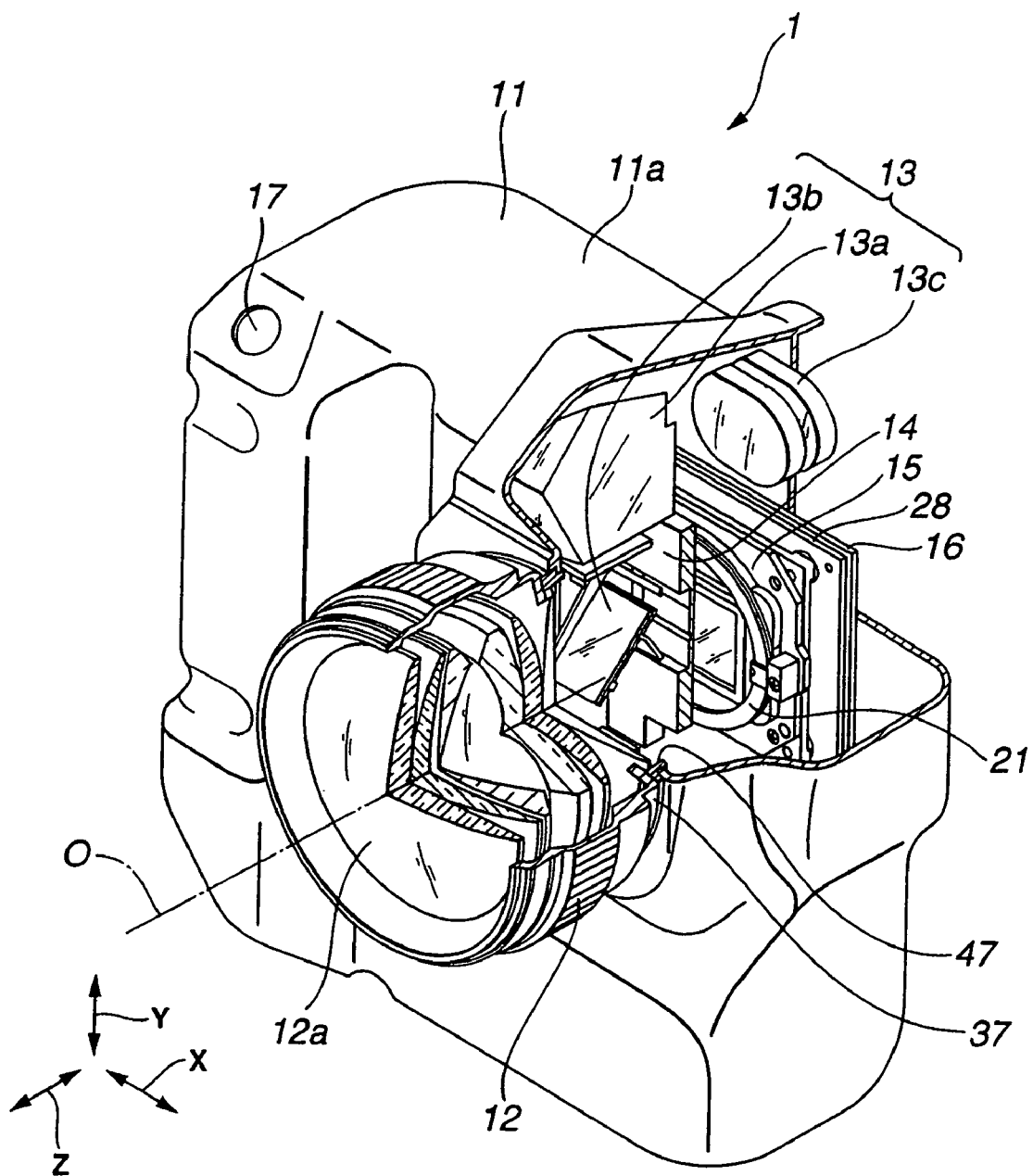
FIG. 1 is a perspective diagram (including a partial section view) of a lens replaceable single-lens reflex type digital camera in a digital camera system according to a first embodiment of the invention.
Figure 2:
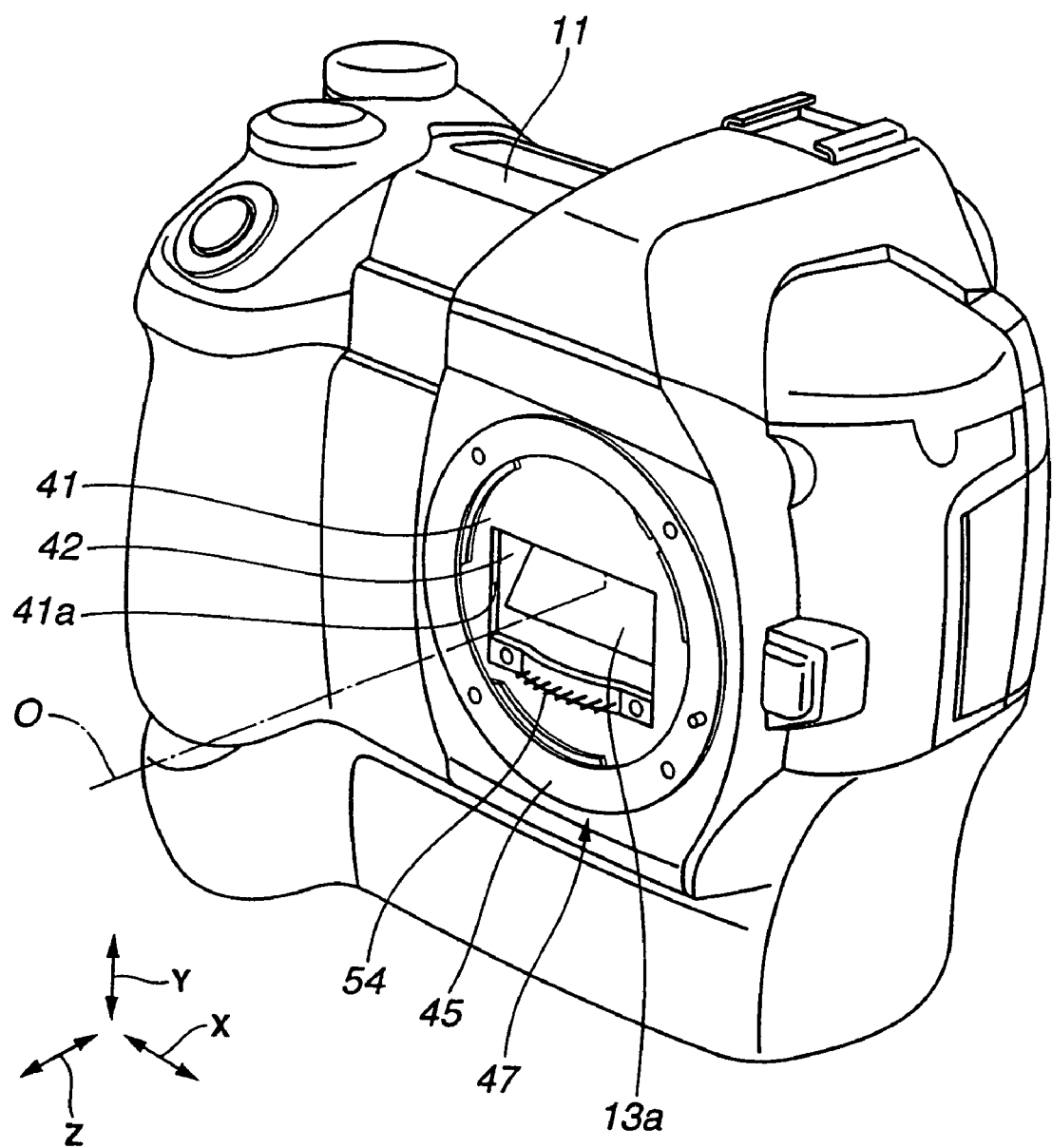
FIG. 2 is a perspective diagram of a digital camera body of the digital camera in FIG. 1.
Figure 3:
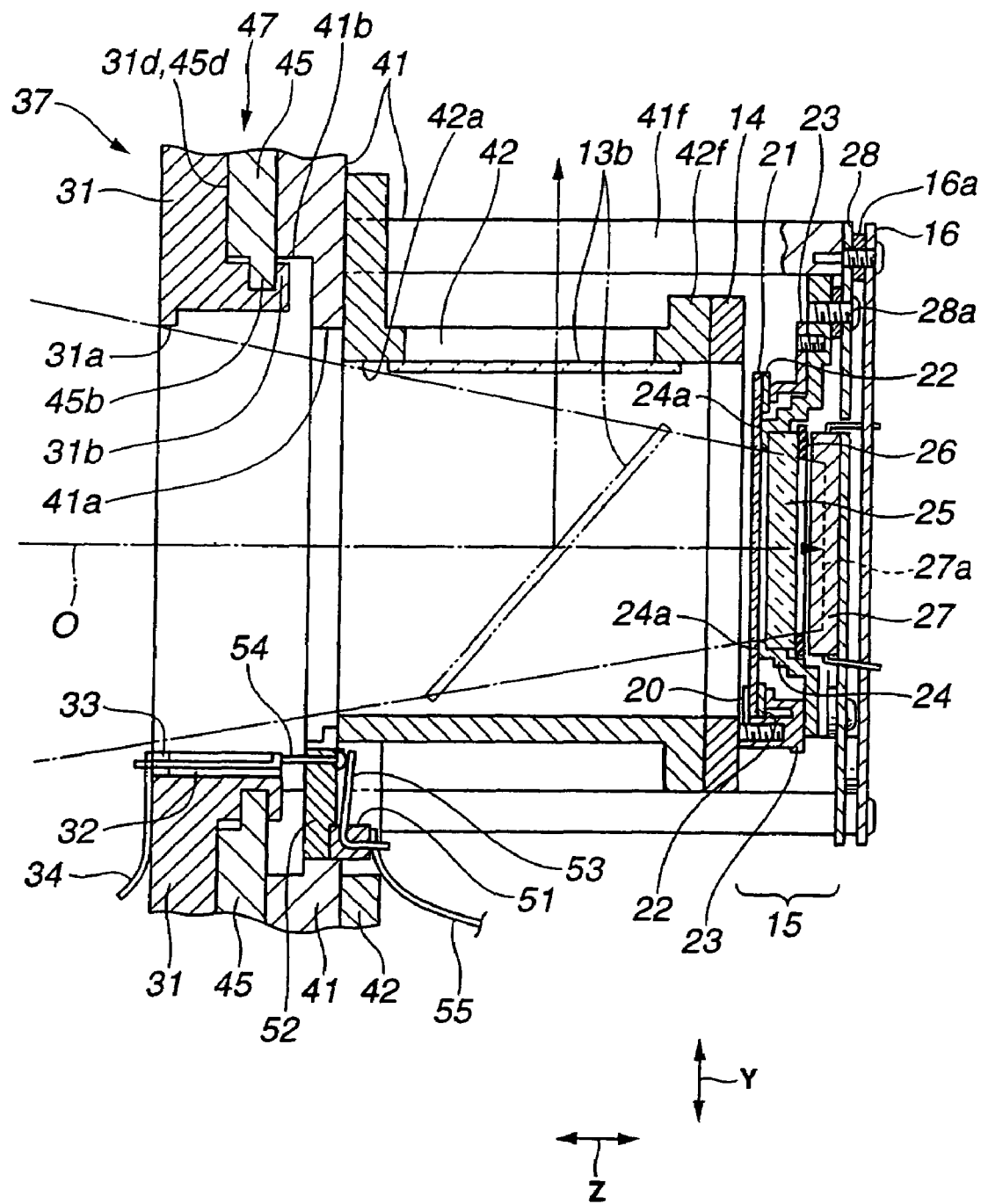
FIG. 3 is a vertical section diagram of a mount portion, mirror box portion and imaging unit where an interchangeable lens is attached to the camera body of the digital camera in FIG. 1.
Figure 4:
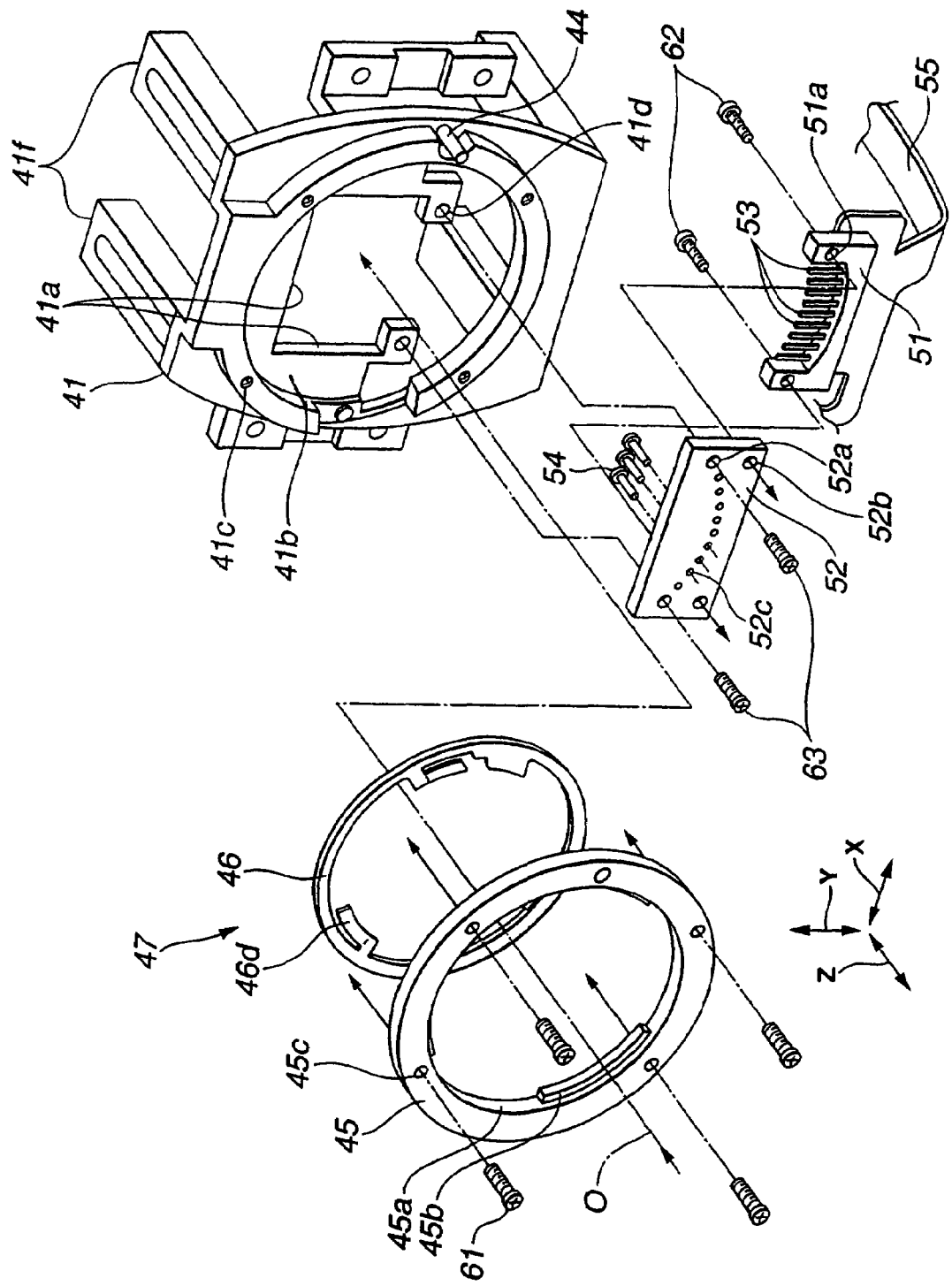
FIG. 4 is an exploded perspective diagram around the mount portion of the camera body in FIG. 1.

FIG. 1 is a perspective diagram (including a partial section view) of a lens replaceable single-lens reflex type digital camera in a digital camera system according to a first embodiment of the invention. FIG. 2 is a perspective diagram of a digital camera body of the digital camera. FIG. 3 is a vertical section diagram of a mount portion, mirror box portion and imaging unit where an interchangeable lens is attached to the camera body of the digital camera. FIG. 4 is an exploded perspective diagram around the mount portion of the camera body.

A digital camera 1 of a digital camera system according to this embodiment includes a digital camera body and multiple kinds of interchangeable lens, which can be attached to the camera body and has unique opening shapes of a mount portion and mirror box portion corresponding to a contained image pickup device. Before the description of the opening shape, internal constructions of a digital camera body (called camera body hereinafter) 11 and interchangeable lens barrel 12 as an interchangeable lens will be described with reference to FIGS. 1 to 4.

Figure 5:
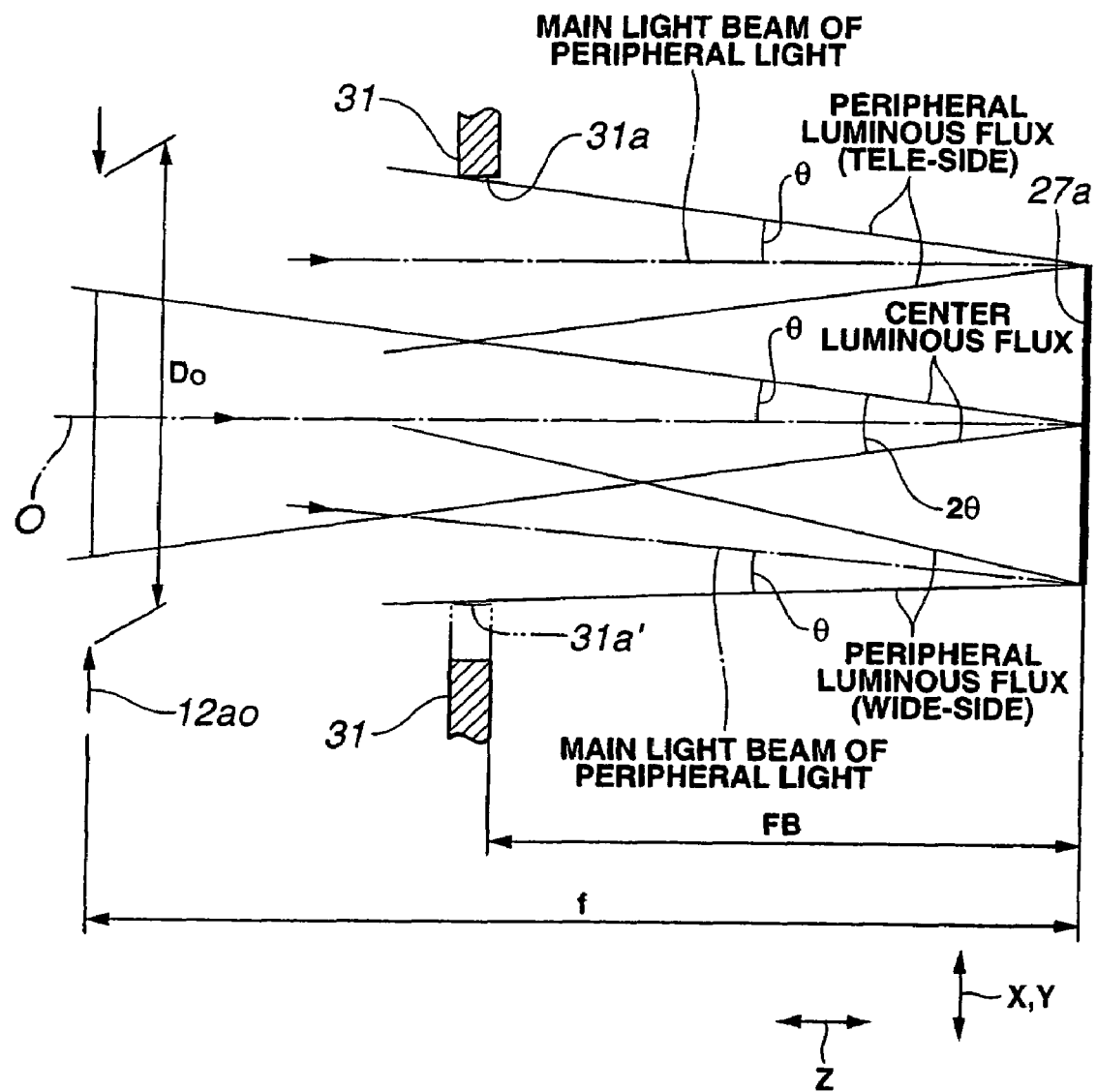
FIG. 5 is a light beam diagram showing the emission of an object luminous flux captured from an interchangeable lens barrel to an image pickup device in the digital camera in FIG. 1.
Figure 6:
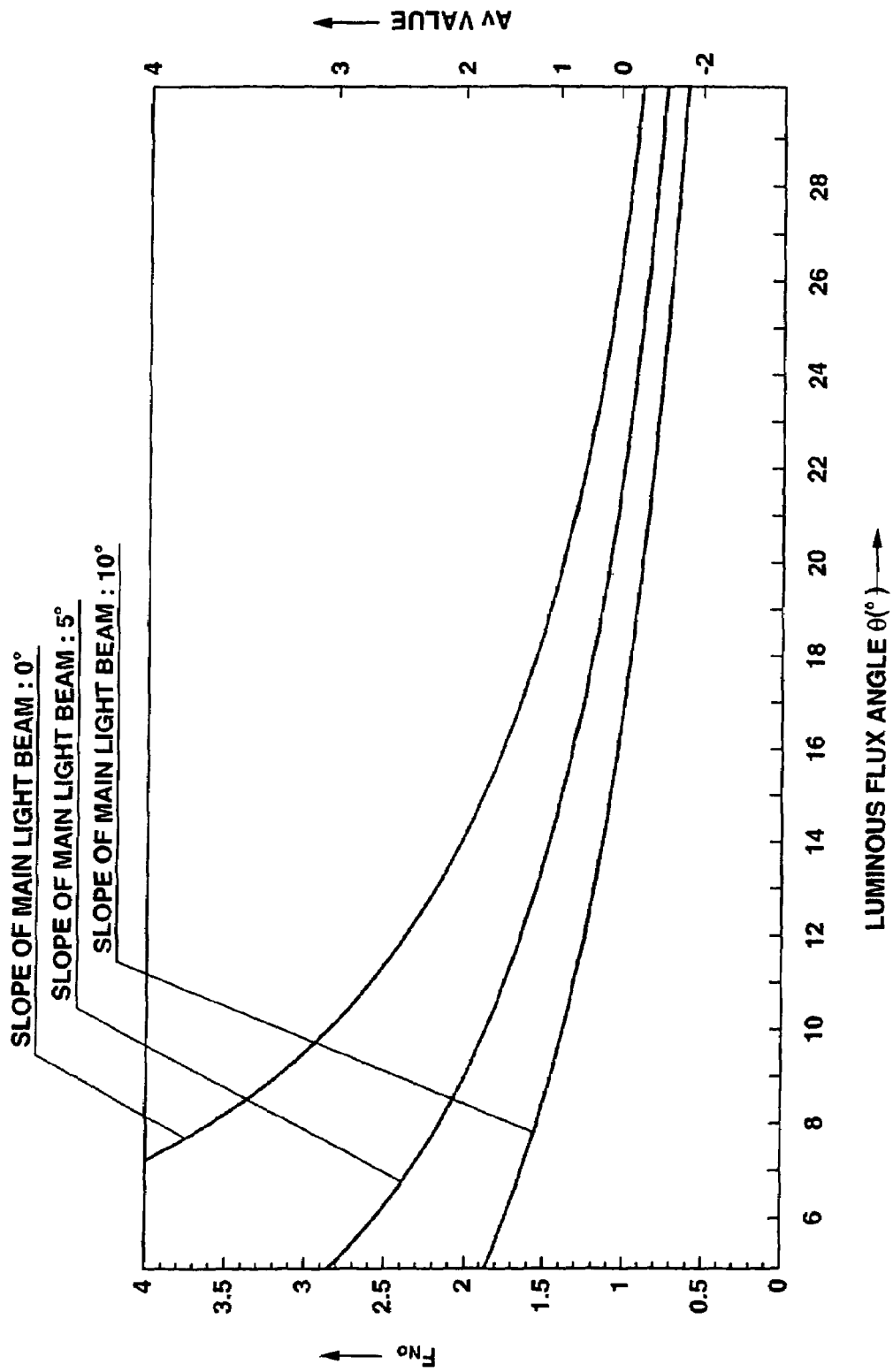
FIG. 6 is a graph showing a relationship of a luminous flux angle θ incident on a photoelectric conversion surface of an image pickup device and F number of an interchangeable lens in the digital camera in FIG. 1.

The interchangeable lens barrel 12 is a lens barrel containing multiple kinds of photographic optical system 12a having various kinds of focal distances as shown in FIGS. 5 and 6, which will be described later. The interchangeable lens barrel 12 has a lens side mount portion 37, which can be attached to the body side mount portion 47, which will be described later, of the camera body 11.

The camera body 11 is a so-called single-lens reflex type camera body including various components provided inside the camera body portion 11a and having a body side mount portion in the front of the surface such that the lens barrel 12 for holding a photographic optical system 12a can be removably attached. In other words, the substantial center portion of the front side of the camera body portion 11a has an exposure opening of a predetermined size, which can guide object luminous flux into the camera body portion 11a. A body side mount portion 47 is provided on the periphery of the exposure opening.

A more detailed construction of the camera body 11 will be described. First of all, various operation members for operating the camera body portion 11a, such as a release button 17 for generating instruction signals for starting a photographic operation, are provided at a predetermined position of the upper surface portion or back surface portion of the camera body 11a.

The camera body portion 11a has, at predetermined positions, a front plate 41, a body side mount portion 47, a mirror box 42, a finder 13, a shutter portion 14, an imaging unit 15 and multiple circuit substrates including a main circuit substrate 16. The front plate 41 has a body side opening portion 41a in the front of the surface side of the camera body portion 11a. The body side mount portion 47 is located on the front surface portion 41b of the front plane 41. The mirror box 42 is fixed behind the mount portion of the front plane 41. The finder 13 is provided for forming a desired object image, which is formed by the photographic optical system 12a, at a predetermined position different from the position on the photoelectric conversion surface 27a, which is an imaging surface of the image pickup device 27. The finder 13 is a so-called observation optical system. The shutter portion 14 is supported by a projection 42f behind the mirror box 42 and includes a shutter mechanism for controlling the time for irradiating object luminous flux to a photoelectric conversion surface of the image pickup device 27. The imaging unit 15 is a unit fixed and held behind the shutter portion 14 by the projection 41f of the front plate 41. The imaging unit 15 includes the image pickup device 27 for obtaining object imaging signals from object light through the imaging optical system 12a. Various electric members of electric circuits such as an image signal processing circuit for performing various kinds of signal processing on the image signals obtained by the image pickup device 27 are implemented on the multiple circuit substrates such as main circuit substrate 16. A dust-preventive filter 21 is provided in the front of the surface of the imaging unit 15. The dust-preventive filter 21 prevents adherence of dust to the photoelectric conversion surface of the image pickup device.

The mirror box 42 has a mirror box opening portion 42a and a space behind the mirror box opening portion 42a. The mirror box opening portion 42a pivotally supports a reflector 13b and allows the passage of object luminous flux from the photographic optical system 12a without vignetting of the luminous flux for forming an image on the photoelectric conversion surface 27a of the image pickup device 27.

The reflector 13b lies in the space behind opening portion 42a and can pivotably move between a reflecting (dotted-line) position for reflecting incident luminous flux to the finder 13 side and a turnout (solid-line) position turning out from the reflecting position.

The finder 13 includes the reflector 13b, a pentaprism 13a and an eyepiece 13c. The reflector 13b is arranged to guide object luminous flux through the photographic optical system 12a by bending the optical axis of the object luminous flux to the observation optical system side. The pentaprism 13a receives luminous flux emitted from the reflector 13b and forms an erect image. The eyepiece 13c forms an image best suitable for enlarging and observing an image formed by the pentaprism 13a.

The reflector 13b, as set forth above, moves between the turnout position away from an optical axis O of the photographic optical system 12a and a predetermined position on the optical axis. Normally, the reflector 13b is located at a predetermined angle, such as 45 degrees, with respect to the halo on the optical axis of the photographic optical system 12a. Thus, when the camera 1 is at the normal state, the optical axis of the object luminous flux having passed through the photographic optical system 12a is bent by the reflector 13b and is reflected to the pentaprism 13a side above the reflector 13b.

On the other hand, while the camera is performing a photographic operation and during the actual exposure operation, the reflector 13b moves from the optical path of the photographic optical system 12a to the aforesaid predetermined turnout position. Thus, the object luminous flux is guided to the image pickup device side and forms an image on the photoelectric conversion surface.

The shutter portion 14 is similar to those generally used in a conventional camera, such as a focal plane type shutter mechanism and a driving circuit for controlling operations of the shutter mechanism.

The imaging unit 15 includes the image pickup device 27, an image pickup device fixing plate 28, an optical low-pass filter (called LPF hereinafter) 25, a low-pass filter receiving member 26, an image pickup device storage case member 24 (called CCD case 24 hereinafter), a dust-preventive filter receiving member 23, the dust-preventive filter 21, a piezoelectric element 22 and a press member 20. The image pickup device 27 constituted by a CCD for obtaining image signals corresponding to the light irradiated onto the photoelectric conversion surface of the image pickup device 27 through the photographic optical system 12a is shown in FIG. 3 and so on. The image pickup device fixing plate 28 is constituted by a thin-plate like member for fixing and supporting the image pickup device 27. The optical LPF 25 is an optical element on the photoelectric conversion surface of the image pickup device 27, for removing high frequency components from an object luminous flux irradiated through the photographic optical system 12a. The low-pass filter receiving member 26 is constituted by an elastic member substantially in a frame shape and is provided on the periphery between the optical LPF 25 and the image pickup device 27. The CCD case 24 stores, fixes and holds the image pickup device 27 and supports the optical LPF 25 by closely abutting to the periphery and the vicinity. A predetermined position of the CCD case 24 is in close contact with the dust-preventive filter receiving member 23. The dust-preventive filter receiving member 23 is provided in the front of the surface side of the CCD case 24 and is in close contact with the periphery or the vicinity. The dust-preventive filter 21 is a dust-preventive member supported by the dust-preventive filter receiving member 23 and faces toward the optical LPF 25 at a position spaced apart from the optical LPF 25 by a predetermined distance in the front of the surface side of the optical LPF 25 on the photoelectric conversion surface side of the image pickup device 27. The piezoelectric element 22 is provided on the periphery of the dust-preventive filter 21 and removes dust by applying a predetermined amount of vibration to the dust-preventive filter 21. The press member 20 is constituted by an elastic body for connecting, fixing and holding the dust-preventive filter 21 to the dust-preventive filter receiving member 23 in an air-tight manner.

The image pickup device 27 performs photoelectric conversion processing on object luminous flux received by the photoelectric conversion surface 27a of the image pickup device 27 through the photographic optical system 12a. Thus, the image pickup device 27 can obtain image signals corresponding to the object image on the photoelectric conversion surface. The image pickup device 27 may be a 4/3 type charge-coupled device or the like. In this case, the term "4/3 type" refers to the size of the image pickup device, and a 4/3 type image pickup device has an image circle with the diameter of about 21.2 to 25 mm.

The image pickup device 27 is implemented at a predetermined position on the main circuit substrate 16 through the image pickup device fixing plate 28. An image signal processing circuit and work memory, not shown, are implemented together on the main circuit substrate 16. Thus, output signals from the image pickup device 27, that is, image signals obtained through optoelectric processing are transmitted to the image signal processing circuit. A protection glass (not shown for simplicity) is attached in front of the photoelectric conversion surface of the image pickup device 27.

The signal processing performed in the image signal processing circuit includes various kinds of signal processing such as processing for converting image signals obtained from the image pickup device 27 to signals suitable for recording. In this case, the image signals correspond to the image formed on the optoelectric surface of the image pickup device 27 by the photographic optical system 12a held within the lens barrel 12 attached to the body side mount portion 47. These kinds of signal processing are the same as processing normally performed in a general digital camera for handling electronic image signals.

The optical LPF 25 is provided in the front of the surface side of the image pickup device 27 through the low-pass filter receiving member 26. The optical LPF 25 is constituted by crystal, which is an optical element having a double refraction characteristic. The optical LPF 25 further contains an infrared absorbing glass.

The CCD case 24 covers the optical LPF 25. The CCD case 24 has a rectangular opening substantially at the center. The optical LPF 25 and image pickup device 27 are provided in the opening from the back. A step 24a having a substantial L-shaped section is provided on the internal periphery on the back side of the opening.

As described above, the low-pass filter receiving member 26 constituted by an elastic member is provided between the optical LPF 25 and the image pickup device 27. The low-pass filter receiving member 26 is provided at a position avoiding an effective range of the photoelectric conversion surface on the periphery of the front surface side of the image pickup device 27. Furthermore, the low-pass filter receiving member 26 is abutted to the vicinity of the periphery of the back side of the optical LPF 25. The optical LPF 25 and the image pickup device 27 are in constant contact with each other, through member 26, substantially in an air-tight manner. Thus, elastic force toward the optical axis by the low-pass filter receiving member 26 acts on the optical LPF 25.

Then, the periphery of the front surface side of the optical LPF 25 is located so as to be in contact with the step 24a of the CCD case 24 substantially in an air-tight manner. Thus, the position in the optical axis direction of the optical LPF 25 is controlled against the elastic force by the low-pass filter receiving member 26 for attempting to move the optical LPF 25 toward the optical axis.

In other words, the optical LPF 25 laid within the opening of the CCD case 24 from the back surface side is positionally controlled by the step 24a in the optical axis direction. Thus, the optical LPF 25 is prevented from coming out from the inside of the CCD case 24 toward the front surface side.

In this way, after the optical LPF 25 is inserted from the back surface side into the opening of the CCD case 24, the image pickup device 27 is located on the back surface side of the optical LPF 25. In this case, the low-pass filter receiving member 26 is held at its periphery between the optical LPF 25 and the image pickup device 27.

As described above, the image pickup device 27 is implemented on the main circuit substrate 16 through the image pickup device fixing plate 28. The image pickup device fixing plate 28 is fixed through a spacer 28a with a screw into a screw hole from the back surface side of the CCD case 24. The main circuit substrate 16 is fixed to the image pickup device fixing plate 28 with a screw through a spacer 16a.

The dust-preventive filter receiving member 23 is fixed to the screw hole of the CCD case 24 in the front of the surface side of the CCD case 24 with a screw. A peripheral slot having a substantial ring shape is provided at a predetermined position in the front of the surface side on the periphery side of the CCD case 24. On the other hand, a ring-shape projection to fit to the peripheral slot of the CCD case 24 has a substantial-ring form at a predetermined position on the back surface side of the periphery side of the dust-preventive filter receiving member 23. Therefore, when the ring-shape projection fits into the peripheral slot, the CCD case 24 and the dust-preventive filter receiving member 23 fit into each other substantially in an air-tight manner in a ring-shaped area, that is, in an area having the peripheral slot and the ring-shaped projection.

The dust-preventive filter 21 contains glass and has a circular or polygonal plate as a whole. An area extending at least from the center of the dust-preventive filter 21 to the edge is transparent. The transparent area faces toward the front surface side of the optical LPF 25 through a predetermined space. The dust-preventive filter 21 is fixed and is held by a press member 20 such that the dust-preventive filter 21 can be associated with the dust-preventive filter receiving member 23 in an air-tight manner. The press member is constituted by an elastic body such as a flat spring.

The dust-preventive filter receiving member 23 has a circular or polygonal opening in the vicinity of the substantial center of the dust-preventive filter receiving member 23. The opening is designed to be large enough for object luminous flux through the photographic optical system 12a to illuminate the photoelectric conversion surface of the image pickup device 27 at the back.

The body side mount portion 47 has a square body side mount opening portion 41a, a body side mount plate 45, a mount spring 46, a contact spring holder 51, a contact spring 53, a mount contact frame 52, and mount contact pins 54. The body side mount opening portion 41a is provided within the front surface portion 41b of the front plate 41, as shown in FIGS. 3 and 4. The body side mount plate 45 and the mount spring 46 are fixed to the front surface portion 41b. A mount flexible substrate (called FPC hereinafter) 55 is attached to the contact spring 53. The mount contact pins 54 is a camera body side connecting terminal. The end of the mount FPC 55 is connected to a lens drive control portion and/or a power supply portion within the camera body 11.

The body side mount plate 45 has a bayonet 45a on the internal periphery of the opening. The mount spring 46 has a spring portion 46d. The body side mount plate 45 is fixed to the front plate 41 with the mount spring 46 being inserted on the back of the body side mount plate 45, by passing each screw 61 through a screw inserting hole 45c and screwing each screw into an opening portion screw portion 41c. A mount lock pin 44 is provided on the periphery of the front surface portion 41b of the front plate 41.

Nine mount contact pins 54 are inserted to pin holes 52c of the mount contact frame 52. The contact spring holder 51 is fixed to and is supported by the mount contact frame 52 by screwing each screw 62 into the screw hole 52b through a screw inserting hole 51a. The fixed and supported mount contact pins 54 are forced, extended and held toward the front of the mount contact frame 52 by nine contact springs 53 attached to the contact spring holder 51.

The mount contact frame 52 having the contact spring holder 51 is fixed outward under the square body side opening portion 41a by screwing each screw 63 to a screw hole 41d through the screw inserting hole 52a. Thus, the bottom part of the body side mount opening portion 41a can be obtained. When the mount contact frame 52 is attached, the mount contact pins 54 are arranged in the form of a circular arc inside of the opening portion 45a of the body side mount plate 45 and under the body side opening portion 41a.

On the other hand, as shown in FIG. 3, the lens side mount portion 37 of the interchangeable lens barrel 12 has a lens side mount opening portion 31a and bayonet nails 31b, which can associate with the bayonet 45a of the body side mount plate 45. Furthermore, nine mount contacts 33 are arranged in the form of a circular arc at the bottom of the lens side mount opening portion 31a. The nine mount contacts 33 are lens side connecting terminals held by the terminal holder 32. The mount contacts 33 are connected to the lens side FPC 34. The lens side FPC 34 has a power supply line and/or an electric drive control line and is connected to a focus driving portion, for example, within the interchangeable lens barrel 12.

In order to attach the interchangeable lens barrel 12 to the camera body 11 having the above-described construction, the lens side mount portion 37 of the interchangeable lens barrel 12 is rotationally fitted into the mount plate 45 of the body side mount portion 47. Then, the bayonet nails 31b are associated therewith such that the lens can be attached. Under the lens-attached condition, the interchangeable lens barrel 12 is electrically connected to the drive control portion of the camera body 11 through the connecting terminal portion so as to allow the control for focus, zoom and iris driving. An object luminous flux enters the finder 13 or the image pickup device 27 through the lens side mount opening portion 31a and the body side mount opening portion 41a, and the object can be observed or be shot.

Here, the form of the mount opening of the lens mount portion 37 and/or the body side mount portion 47 for passing luminous flux and the form of luminous flux passing portion of the mirror box 42 will be described.

In the description below and the drawings, the direction along the optical axis O is the Z-direction. The object side (lens side) of the Z-direction is the front while the image pickup device side (image-forming side) is the back. The direction orthogonal to the optical axis O and along the longer side in the imaging range (photoelectric conversion surface) of the image pickup device is an X-direction (horizontal direction). The left and right are determined from the object viewpoint. The direction orthogonal to the optical axis O and along the shorter side of the imaging range (photoelectric conversion surface) of the image pickup device is a Y-direction (vertical direction).

In a digital camera system according to this embodiment, in order for object luminous flux captured by the interchangeable lens barrel 12 to enter to the periphery of the imaging range of the image pickup device 27, the mount portion and the member, such as a mirror box, between the image pickup device and the lens must have openings. In other words, in order to guide light uniformly to the center and periphery of the image pickup device, the openings must have a form allowing the same luminous flux angle as the luminous flux angle of the luminous flux from the end to the center of the imaging range. In this case, as the degrees of the tilt of the main light beam of a luminous flux incident on the periphery to the optical axis increases, the size of the openings can be reduced.

FIG. 5 is a light beam diagram showing an entering state of an object luminous flux captured from the interchangeable lens barrel 12 to the image pickup device 27.

As shown in FIG. 5, the object luminous flux entering from the exit pupil diameter D0 of the interchangeable lens barrel 12 and the center and peripheral luminous flux entering to the center and periphery of the optical axis O of the photoelectric conversion surface 27a on the imaging range of the image pickup device 27 have a luminous flux angle $\theta$ about the respective main light beams, where the luminous flux angle $\theta$ refers to an angle of one side of a luminous flux (that is, half angle).

In order to prevent a shortage in light amount of the periphery in the imaging range, the vignetting of the peripheral luminous flux must be prevented at the lens side mount opening portion 31a (having at least an opening range Rm mentioned later), the body side mount opening portion 41a (opening having the opening range equal to the opening range Rm mentioned later for preventing the vignetting of luminous flux passing therethrough) and a light passing portion of the mirror box 42. At the limit of the longer focal distance side (Tele side), the photographic optical system 12a requires a shown lens side opening portion 31a because the main light beam of the peripheral luminous flux is parallel to the optical axis O. On the other hand, on the short focal distance side (Wide side) shorter than the long focal distance, the photographic optical system 12a requires an opening 31a' narrower than the lens side opening portion 31a because the main light beam of the peripheral luminous flux is a light beam tilting toward the optical axis O.

In the photographic optical system 12a, when an object distance is at infinity, the exit pupil position 12a0 of the exit pupil diameter D0 is spaced from the photoelectric conversion surface 27a, which is at an image-forming position), by a focal distance f. The luminous flux angle θ is expressed by:

$$\tan(\theta) = D0/(2 \times f) \quad \text{EQ1}$$

The relationship of the exit pupil diameter D0, the focal distance f and F No. (the F-number) is:

$$F\,No. = f/D0.$$

Based on EQ1, the relationship between the luminous flux angle θ and the F-number is:

$$\theta = \tan^{-1}(1/(2 \times F\,No.)) \quad \text{EQ2}$$

FIG. 6 is a graph showing a relationship between the luminous flux angle θ and the F-number (or Av value). In FIG. 6, when the slope of the main light beam is 5 degrees or 10 degrees, the luminous flux angle θ is an angle of the outer light beam of a peripheral luminous flux with respect to the optical axis O. The angle of the slope of the main light beam is plus in the counterclockwise direction in FIG. 5.

The mount diameter Dm (FIG. 11) of the mount portion (such as lens side opening portion 31a or the body side opening portion 41a) required at the position spaced from the imaging surface by a predetermined distance (flange back) FB with respect to an image circle (having a diameter Di, see FIG. 11) including the imaging range of the photoelectric conversion surface 27a is expressed by:

$$Dm = Di + 2 \times FB \times \tan\theta \quad \text{EQ3}$$

or $$Dm = Di + FB/F\,No. \quad \text{EQ4}$$

As described above, the image pickup device 27 is a 4/3 type CCD and has an imaging range of the photoelectric conversion surface 27a of 17.8 mm (long side)×13.4 mm (short side) with an aspect ratio of about 4:3 (where the imaging range corresponds to an effective pixel range L-w2× L-h2 mentioned later, see FIG. 10). The diameter Di2 of the image circle I-ce circumscribing the square imaging range is 22.28 mm.

Figure 7:
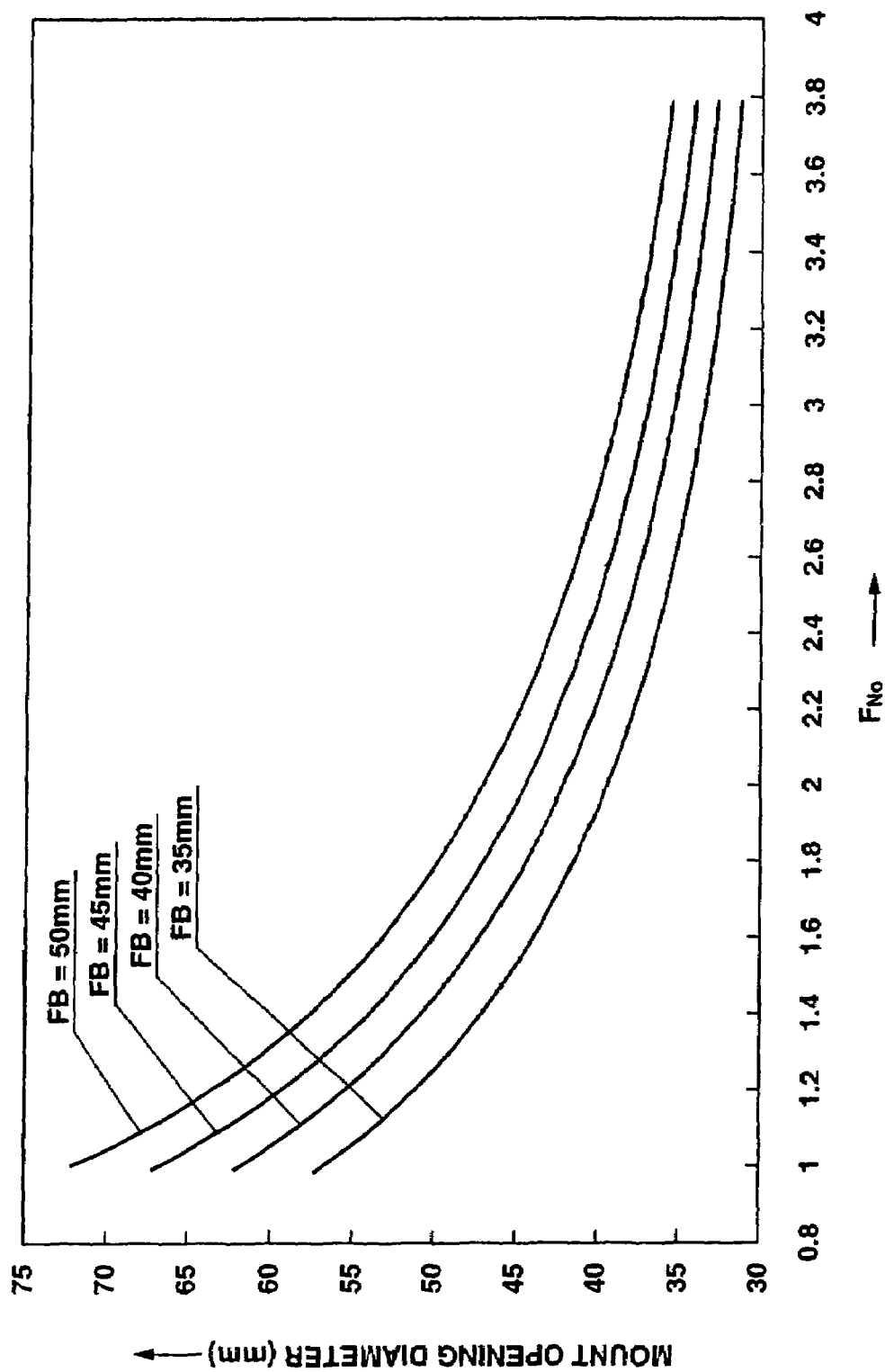
FIG. 7 is a graph showing mount diameters Dn for F numbers of an interchangeable lens in the digital camera in FIG. 1 by using FBs as parameters.

FIG. 7 is a graph indicating mount diameters for F-numbers by using FBs as parameters when the value of the diameter Di2 is applied to the diameter Di of the image circle of the image pickup device 27 based on EQ4.

The luminous flux angle θ required for capturing an object bundle from an interchangeable lens depends on the intensity of the used lens in principle. In other words, as the intensity of the used lens increases (that is, as the F number decreases), the luminous flux angle θ must be increased. For example, in order to guide a luminous flux having the F No. 2.8 to the end of the image circle, the luminous flux angle θ is about 10 degrees. In order to guide a luminous flux having F No. 1.4, the luminous flux angle θ is about 20 degrees (FIG. 6). In this way, by increasing the luminous flux angle θ, the lens having larger intensity can be used. However, as shown in the graph, the relationship of the applicable F-numbers and luminous flux angles θ is not linear. Then, when a lens having a small F No. is used, the luminous flux angle θ must be rapidly increased.

Generally, the F No. of a wide angle lens is smaller while the F No. of a telephoto lens is larger. Generally, when a focal distance is about 50 mm, the F No. is about 1.4. When the focal distance is about 300 mm, the F No. is about 2 to 2.8. This is because, a telephoto lens is no longer practical when the F No. is small.

As described above, the main light beam of a peripheral luminous flux is not always parallel to the optical axis. Especially, when a wide-angle lens is used, the amount of the slope is increased. For example, FIGS. 8 and 9 show a light beam diagrams of a wide-angle lens and a telephoto lens, respectively.

Figure 8A:
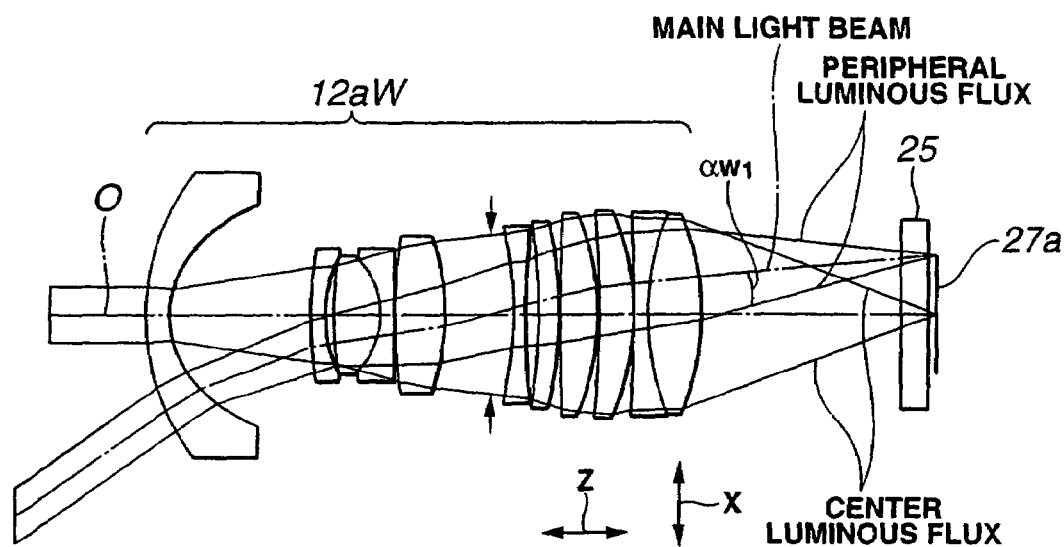
FIG. 8A is a diagram showing a longitudinal section (section in X-direction) of a photoelectric conversion surface where a center luminous flux and peripheral luminous flux through a wide angle interchangeable lens barrel attached to the digital camera in FIG. 1 are emitted to the photoelectric conversion surface (image forming surface)
Figure 8B:
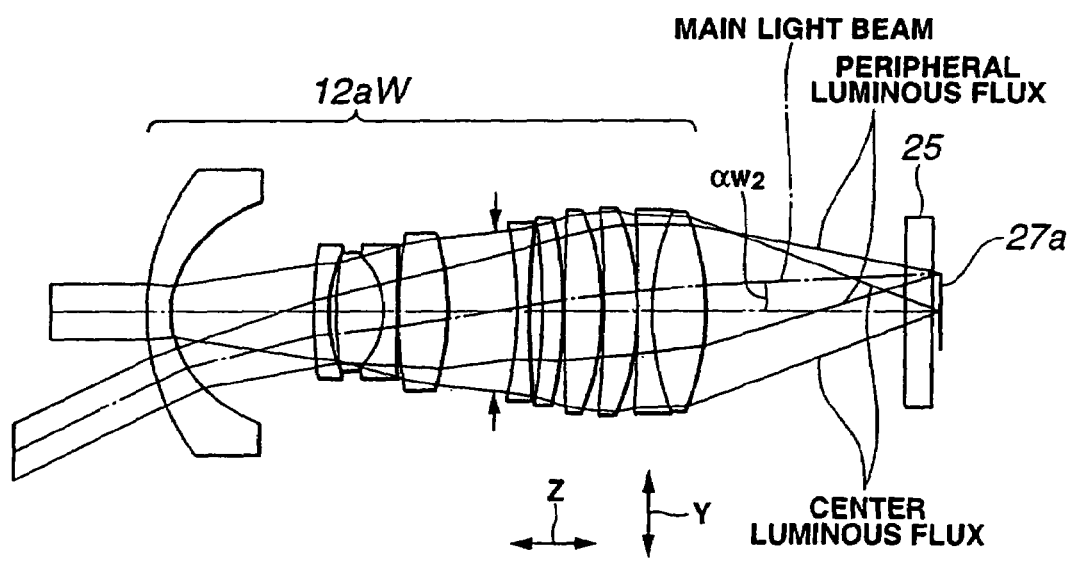
FIG. 8B shows a latitudinal section (section in Y-direction) of a photoelectric conversion surface where a center luminous flux and peripheral luminous flux through a wide angle interchangeable lens barrel attached to the digital camera in FIG. 1 are emitted to the photoelectric conversion surface (image forming surface)
Figure 9A:
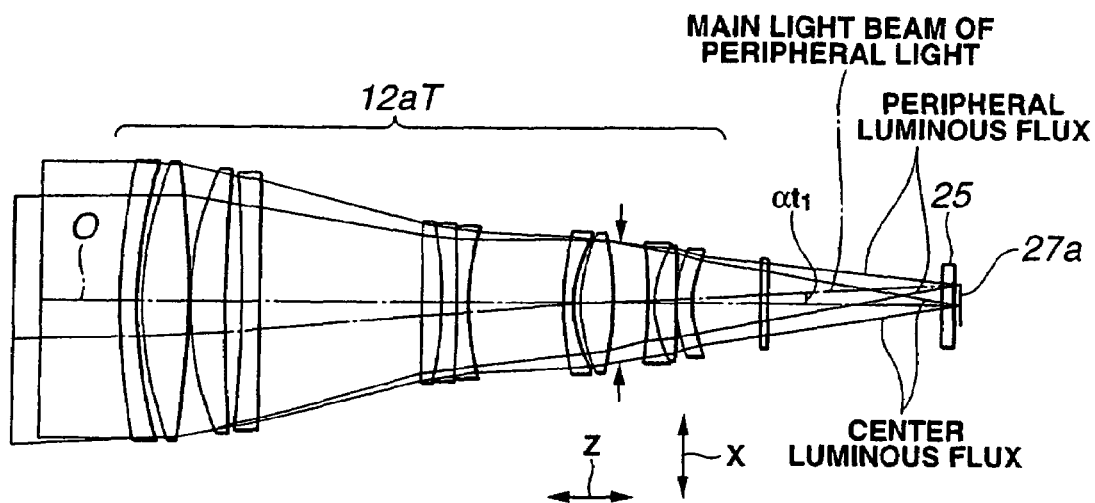
FIG. 9A is a diagram showing a longitudinal section (section in XZ-direction) of a photoelectric conversion surface where a center luminous flux and peripheral luminous flux through a replacement telephoto lens barrel attached to the digital camera in FIG. 1 are emitted to the photoelectric conversion surface (image forming surface)
Figure 9B:
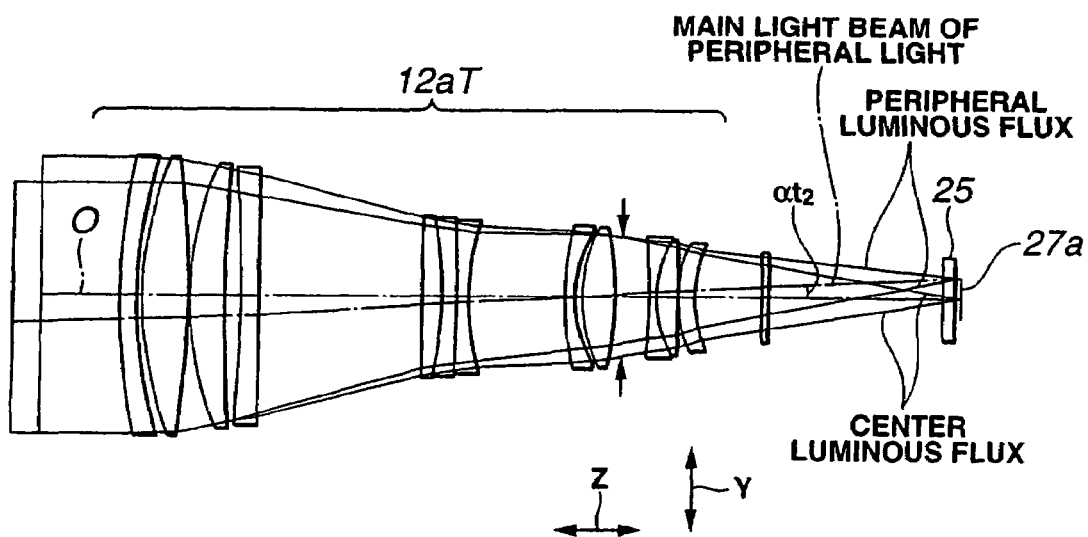
FIG. 9B is a diagram showing a latitudinal section (section in YZ-direction) of a photoelectric conversion surface where a center luminous flux and peripheral luminous flux through a replacement telephoto lens barrel attached to the digital camera in FIG. 1 are emitted to the photoelectric conversion surface (image forming surface)

FIGS. 8A, 8B and 9A, 9B are diagrams showing states where the center luminous flux and peripheral luminous flux enter the photoelectric conversion surface (Image-forming surface) 27a of an image pickup device. FIGS. 8A, 8B show a case where a wide angle interchangeable lens barrel (with f 12.55 mm and F No. 1.4) is attached. FIGS. 9A, 9B show a case where a telephoto interchangeable lens barrel (with f 300 mm and F No. 2.8). FIGS. 8A and 9A show sections in a longer side direction (XY section) of the photoelectric conversion surface 27a. FIGS. 8B and 9B show sections in a shorter side direction (YZ section) of the photoelectric conversion surface 27a.

The angles α-w1 and α-w2 of inclination of the main light beam of a peripheral luminous flux by a wide-angle photographic optical system 12aW shown in FIGS. 8A and 8B are about 5 degrees. The angles α-t1 and α-t2 of the main light beam of the peripheral luminous flux by a telephoto photographic optical system 12aT shown in FIGS. 9A and 9B are smaller than the angles of inclination of the main light beam of the wide-angle photographic optical system 12aW.

Based on this fact, no problems occur if the luminous flux angle θ is set to be compliant with the lens having an F No. 3 to 4 or below when the amount of inclination of the main light beam is zero. More preferably, the luminous flux angle θ is set to be compliant with the lens having the F No. 2 to 2.8 or below.

In order to satisfy the optical characteristic, the proper size of the camera body must be practically obtained while in consideration of the proper F-number. Therefore, the compliant F-number is applied from the viewpoint of the size of the camera body as described below.

In other words, the height of a camera body of a lens replaceable silver halide camera system is about 90 to 120 mm. The thickness is about 60 to 80 mm. That is, a size which is extremely larger than the height and the thickness is not practical. In order to obtain a height of about 90 to 100 mm, the mount opening diameter must be about 50 mm or below and preferably smaller than 45 mm. The diameter is desirably about 40 mm. In order to achieve the thickness of about 60 to 80 mm as described above, the flange back FB must be about 35 to 50 mm.

Apparently from the relationship between the mount opening diameter and the F number of the image pickup device 27 shown in FIG. 7, which is a 4/3 type CCD, when the size of the opening diameter is limited, the luminous flux angle θ must be set so as to have the compliant F number larger than F numbers 1.4 to 1.8 and more preferably F numbers 1.6 to 2.2.

In order to achieve the optical limitation and a practical body size, the luminous flux angle θ is preferably set to be compliant with the lens having F-numbers 1.4 to 4. More preferably, the luminous flux angle θ is set to be compliant with the lens having F-numbers 1.6 to 2.8.

Therefore, when the circle of the reference opening is a circle obtained by extending a predetermined image circle to the opening portion in a direction away from the optical axis O by a predetermined angle in accordance with the compliant F number as described above, the desired compliant F number can be obtained.

Since the real imaging range of the image pickup device 27 is rectangular, the required shape of the opening does not have to be circular. At least a square inscribing the reference opening is only required. Therefore, an opening is required having a size larger than the square formed by connecting ends of a segment extending to the opening portion in a direction away from the optical axis by a predetermined angle in accordance with the proper F number diagonally from the square of the imaging range.

According to this embodiment, the diameter Di of the image circle corresponding to the recording screen range is 21 to 23 mm or 21.6 to 22.7. The diagonal length of the recording range inscribing the image circle is about half (21.6 mm) of the diagonal line of a 135-format screen. In other words, when a lens having the focal distance of 50 mm is used in a digital camera according to this embodiment, the angle of view can be the same as the angle obtained when a lens having the focal distance of about 100 mm is used in a 135-format camera. Therefore, the correlation of the angle of view with respect to the 135-format camera can be realized only by doubling the focal distance of the lens.

The imaging range on the photoelectric conversion surface 27a of the image pickup device 27 is a screen with the aspect ratio of 4:3 inscribing the image circle. No practical problems occur when luminous flux from the lens can reach onto the recording screen range within the imaging range. However, an image circle larger than the image circle corresponding to the recording screen range to some extent is desirably set in consideration of errors occurring in manufacture and in assembly.

Figure 10:
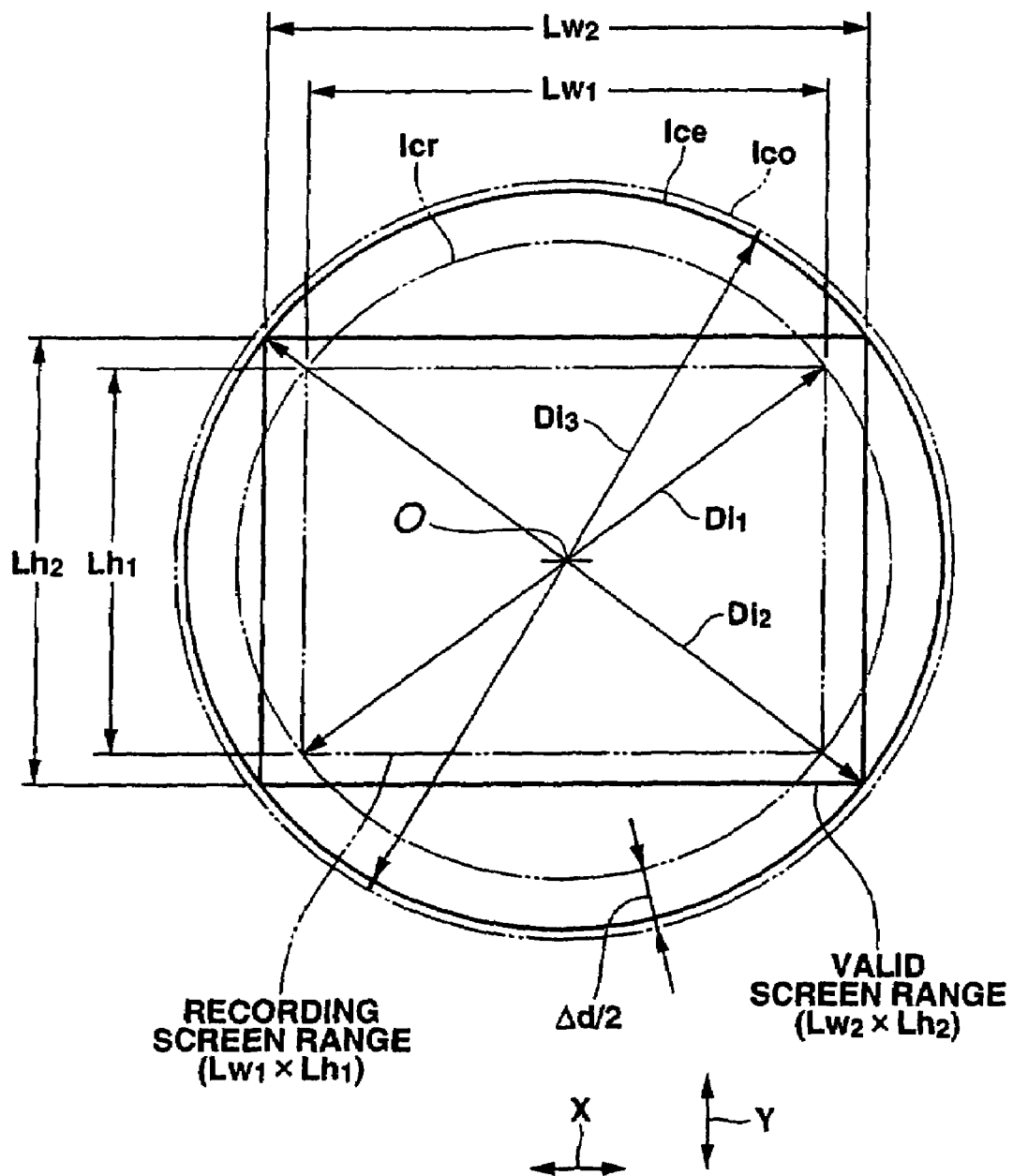
FIG. 10 is a diagram showing an effective screen range (effective imaging range) and recording screen range (imaging and recording screen) of a photoelectric conversion surface of an image pickup device in the digital camera in FIG. 1 and image circles corresponding to the ranges.

FIG. 10 is a diagram showing a valid screen range (valid imaging range) and recording screen range (imaging and recording range) in the photoelectric conversion surface 27a of the image pickup device 27 (see FIG. 3) and image circles corresponding to the ranges.

In the image pickup device 27, as shown in FIG. 10, a recording screen range L-w1×L-h1 must be smaller than a valid screen range L-w2×L-h2. The recording screen range L-w1×L-h1 is a range to be actually converted to electric signals as image information during image processing and to be captured. The valid screen range L-w2×L-h2 is an entirely shootable range of the image pickup device 27. This is because the outer area around a required recording pixel (called peripheral pixel area hereinafter) is required for creating the recording pixel by the image pickup device 27. Furthermore, due to the precision limits in dimension of the image pickup device 27 itself and positional errors in assembly of the image pickup device 27 to the camera body 11 through the image pickup device fixing plate 28 and the front plate 41, the position of the optical axis O is displaced from the center of the valid screen range L-w2×L-h2 of the image pickup device 27. In order to absorb the displaced amount, the valid screen range L-w2×L-h2 is taken larger than the recording screen range L-w1×L-h1 as described above.

The form of the opening must be determined so as to prevent vignetting of the object luminous flux in a range entering to the valid screen range L-w2×L-h2 as the imaging range, which is passing through the interchangeable lens barrel 12 and the camera body 11. The decrease in light amount of peripheral light in the valid screen range L-w2×L-h2 must be prevented.

The circumscribed circle of the recording screen range L-w1×L-h1 is the recording screen image circle I-cr, and the diameter is Di1. The circumscribed circle of the valid screen range (imaging range) L-w2×L-h2 including the peripheral pixel area is a valid screen image circle (imaging range image circle) I-ce of the valid screen range (imaging range), and the diameter is Di2. In the real design, the valid screen image circle I-ce is slightly larger. The increased amount Δd is added to the diameter Di2 of the valid screen image circle I-ce, and the valid screen image circle I-ce is added to the recording screen image circle I-cr. Then, an image circle I-c0 having a diameter Di3 can be obtained. By applying the imaging range of the image circle I-c0, the form of the openings can be set. More specifically, the image circle I-co having the increased amount Δd of about 1 mm is handled as a reference image circle corresponding to the recording screen range. However, in the description below, the form of openings are set by using the valid screen image circle I-ce as an imaging range image circle (which is a reference image circle I-c having the diameter Di mentioned below) and by using the valid screen range L-w2×L-h2 as an imaging range (imaging range Ri mentioned below). The size of the valid screen range (imaging range) L-w2×L-h2 is 17.8 mm×13.4 mm according to this embodiment.

The diameter Dm of the circumscribed circle Im for the square mount opening range Rm, which is a reference opening guided by a luminous flux angle θ of a predetermined half angle diagonally from the end of the imaging range Ri inscribing the reference image circle I-c is determined as follows.

In this case, the mount opening range Rm minimizes the size of the form of the lens side mount opening portion 31a. In other words, the lens side mount opening portion 31a of the interchangeable lens having the maximum mount opening portion among interchangeable lenses of the camera system is set to be sufficient to cover at least the square of the mount opening range Rm (where the minimum mount opening range of the lens side mount opening portion 31a is Rm). The body side mount opening 41a is also set to at least the size of the square opening range Rm. Thus, the form of the opening prevents the vignetting of object luminous flux passing through the mount opening range Rm.

In order to guide a desired luminous flux to the periphery of the image pickup device, nothing should block the luminous flux from the exit pupil position of the optical system to the image pickup device. Therefore, the members provided between the exit pupil position and the image pickup device also need openings. In other words, members, such as a mirror box, a body side mount, a lens side mount and a flare iris, provided between the exit pupil position and the image pickup device must have the opening range Rm in order to prevent vignetting of object luminous flux. Since the camera system is lens-interchangeable, the range of the opening on the camera body side must be set so as to handle the attachment of an interchangeable lens (called the maximum light beam interchangeable lens hereinafter) having the outermost light beam in exit light beams is the farthest from the optical axis among interchangeable lenses of the camera system. On the other hand, the opening range of the interchangeable lens side can be set in accordance with the outermost light beam of the exit light beams of each lens. In other words, the opening range can be smaller with an interchangeable lens having a narrower outermost light beam than that of the maximum light beam interchangeable lens. In this case, in the lens side mount portion, the forms of fitting portions of the mount, such as bayonet nails, relating to the mount to the camera body are common in all interchangeable lenses.

Figure 11:
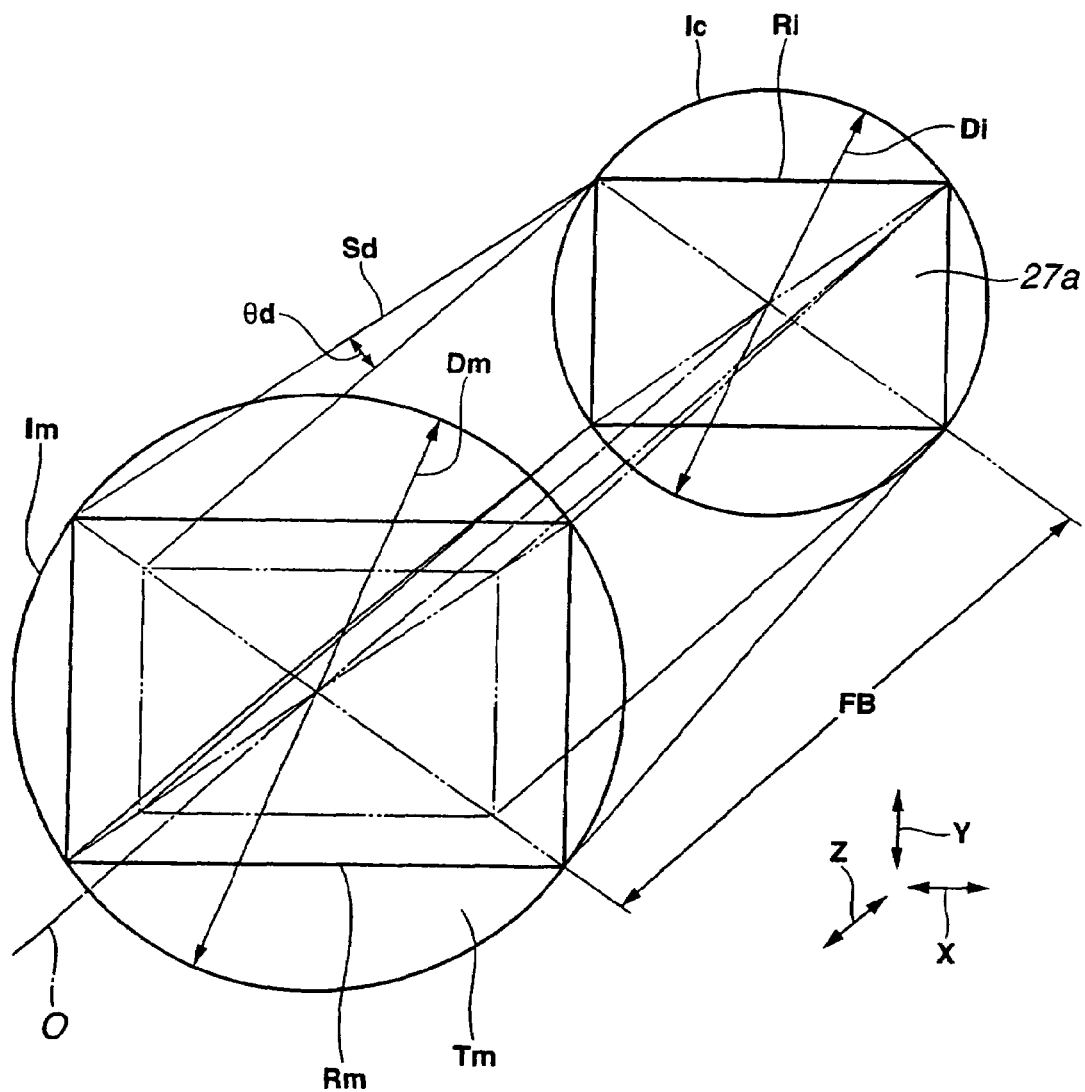
FIG. 11 is a light beam diagram showing a relationship of a mount opening and the circumscribed circle with respect to an imaging range inscribing a reference image circle of the image pickup device in the digital camera in FIG. 1.

FIG. 11 is a light beam diagram showing a relationship between the mount opening range Rm and the circumscribed circle Im and the imaging range Ri inscribed in the reference image circle Ic.

As shown in FIG. 11, the mount opening range Rm giving the minimum opening of the lens side mount opening portion 31a is a square range obtained by connecting ends of four segments Sd extending to the position of the mount opening portion tilting outward and being spaced by a flange back FB with respect to the optical axis O diagonally from the square of the imaging range Ri. The predetermined luminous flux angle θd may be 12 to 14 degrees in order to satisfy the flange back FB and/or F number.

The body side opening 41a also has at least the size of the mount opening range Rm. Furthermore, in shooting, those elements blocking the object luminous flux (such as the reflector 13b and the shutter opening frame) are not positioned in the space enclosed by four planes of the four segments within the mirror box 42.

In the camera body shown in FIG. 2, as shown in the section diagram in FIG. 3, the mirror box 42, the front plate 41 and the body side mount portion 47 are located between the image pickup device 27 and the interchangeable lens 12. Therefore, the opening portion of these members is formed so as to satisfy the mount opening range Rm at the position in the optical axis direction where the opening is located.

By setting the mount opening range Rm as described above, the interchangeable lens with the AV value of 2.5 to 2 becomes compliant even when the luminous flux having a main light beam parallel to the optical axis enters the end of the imaging surface. In other words, even when F No. 1.4 (AV value: 1) is used, the difference in light amount for the AV value of 1.5 to 1 only occurs between the center and the periphery.

As described above, the lens having a small F No. as described above is a wider angle lens. Therefore, the main light beam of peripheral luminous flux tilts by some degrees with respect to the optical axis. Therefore, the above-described difference in light amount does not actually occur. Like the lens shown in FIGS. 8A, 8B, when the main light beam of the peripheral luminous flux tilts by about 5 degrees, the luminous flux of 1.4 to 1 in AV value can be guided to the periphery. In other words, with the interchangeable lens having F No. 1.4 only causes 0.4 or below in AV value between the center and the periphery, which is not a significant problem. On the other hand, even a brighter telephoto lens causing the main light beam of the peripheral luminous flux to be substantially parallel to the optical axis has F No. 2 to 2.8 (2 to 3 in AV value), which is not a practical problem.

The diameter Dm of the circumscribed circle Im having the mount opening range Rm, which is a reference opening here depends on the distance from the imaging surface to the opening. The diameter Di of the image circle Ic in view of the placement of the mirror box 42 having the reflector 13b between the image pickup device and the body mount desirably satisfies:

$$Dm/Di \geq 1.8$$

Thus, the turnout reflector 13b can be located outside of the inclined plane formed by facing segments Sd (FIG. 11) connecting the imaging range between the body mount and the image pickup device and the mount opening. Furthermore, the inserted reflector 13b, shutter 14 and various filters may be located between the body mount and the image pickup device.

Furthermore, as described above, a body side mount contact pin 54 and lens side mount contact 33, which are terminals for connecting the power supply line and the drive control signal line are provided in the body side mount portion 47 of the camera body 11 and the lens mount portion 37 of the interchangeable lens barrel 12. The area for locating the connection terminal portions can be reduced in size by locating the connection terminal portions in a comb-shaped space area Tm (FIG. 11) established between the square-shaped mount opening range Rm and the circumscribed circle Im.

The area for locating the connection terminal portions is not limited to the comb-shaped space area Tm shown in FIG. 11 but may be an upper or left or right side horizontal comb space area.

As an example of a real typical value of the imaging portion and mount portion in the digital camera 1 according to the first embodiment, the image circle diameter Di is in the range of 21.6 to 22.6 mm. The flange back (distance from the photoelectric conversion surface to the mount opening portion) FB is 40.2 mm. The imaging range (which is a valid pixel range with an aspect ration of about 4:3 on the photoelectric conversion surface) Lw×Lh (=the above-described Lw2×Lh2) is 17.8 mm×13.4 mm.

Next, a digital camera system according to a second embodiment of the invention will be described with reference to FIGS. 12 and 13A and 13B.

Figure 12:
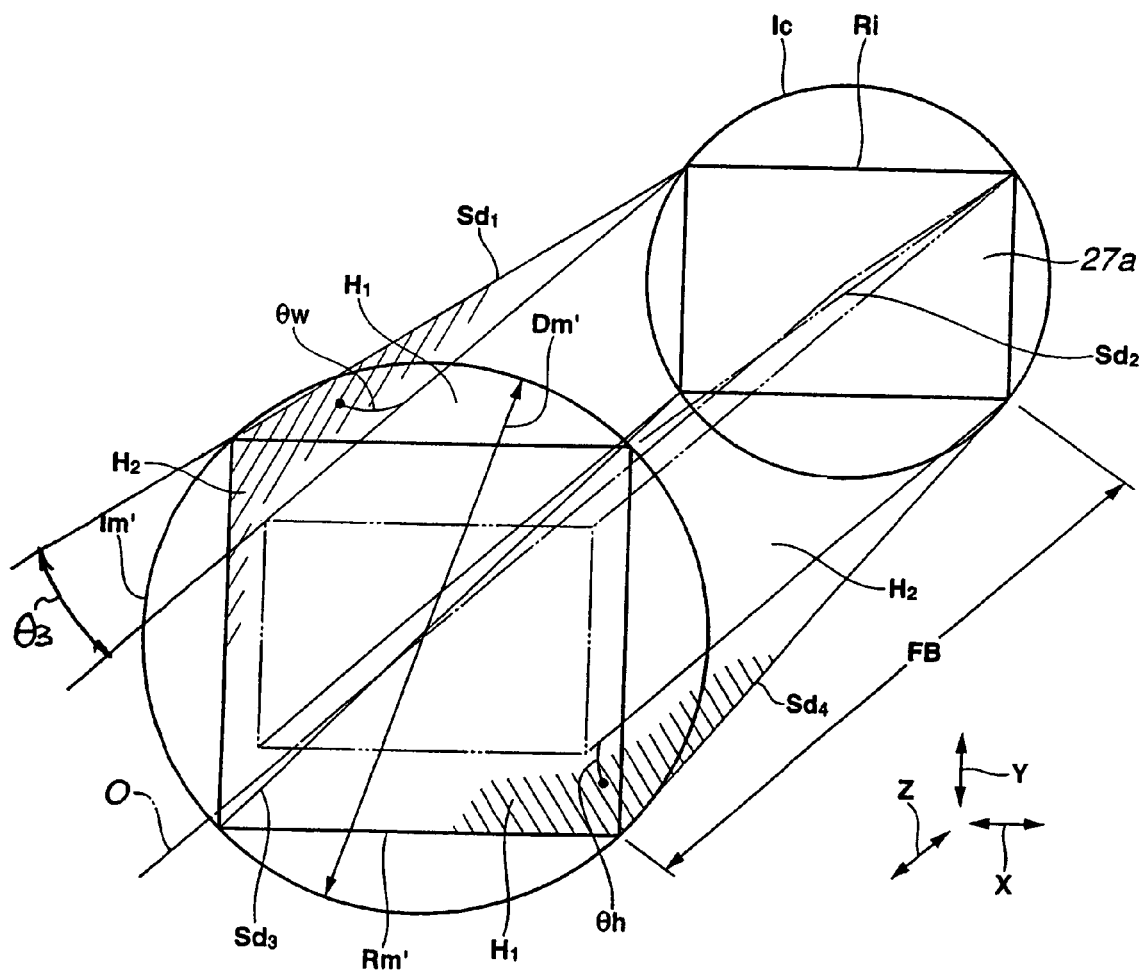
FIG. 12 is a light beam diagram showing a relationship between an image circle circumscribing an imaging range of an image pickup device applied in a digital camera according to a second embodiment of the invention and a circumscribed circle of a mount opening.

FIG. 12 is a light beam diagram showing a relationship between an image circle circumscribing an imaging range of an image pickup device of a camera body applied in this embodiment and a circumscribed circle of a mount opening. FIGS. 13A and 13B are light beam diagrams between the photoelectric conversion surface of the image pickup device according to this embodiment and a mount opening portion. FIG. 13A shows a light beam diagram of a section along a ZX surface (horizontal surface). FIG. 13B is a light beam diagram of a section along a ZY surface (vertical surface).

An interchangeable lens type digital camera according to this embodiment is a digital camera having compliant F No. of a short side and long side of an imaging range different from those of the digital camera 1 according to the first embodiment. In the digital camera, a compliant F No. is set at the ends in the short and long side directions of the imaging range. The opening having a size equal to or larger than the size of the square is obtained by extending the ends in the short and long side directions from the short and long sides of the imaging range to the mount opening portion position in a direction away from the optical axis by a predetermined angle corresponding to the compliant F No. The other constructions are similar to that of the digital camera 1 according to the first embodiment, and the same reference numerals are given to the same components hereinafter.

Figure 13A:
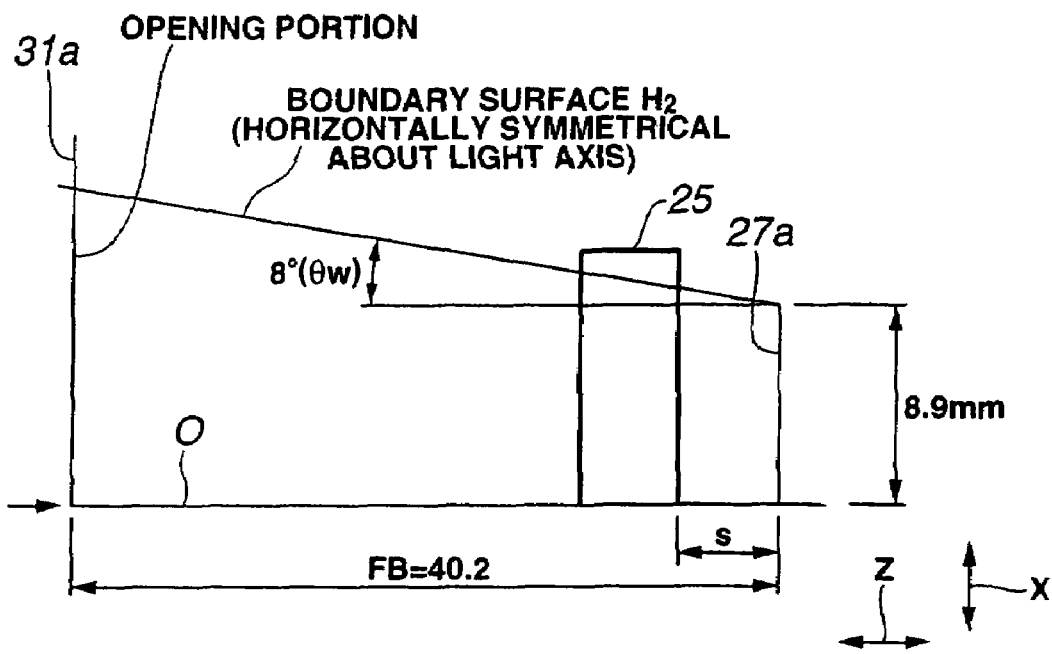
FIG. 13A shows a light beam diagram of a section along a ZX surface (horizontal surface) between a photoelectric conversion surface of the image pickup device and the mount opening portion in the digital camera in FIG. 12.
Figure 13B:
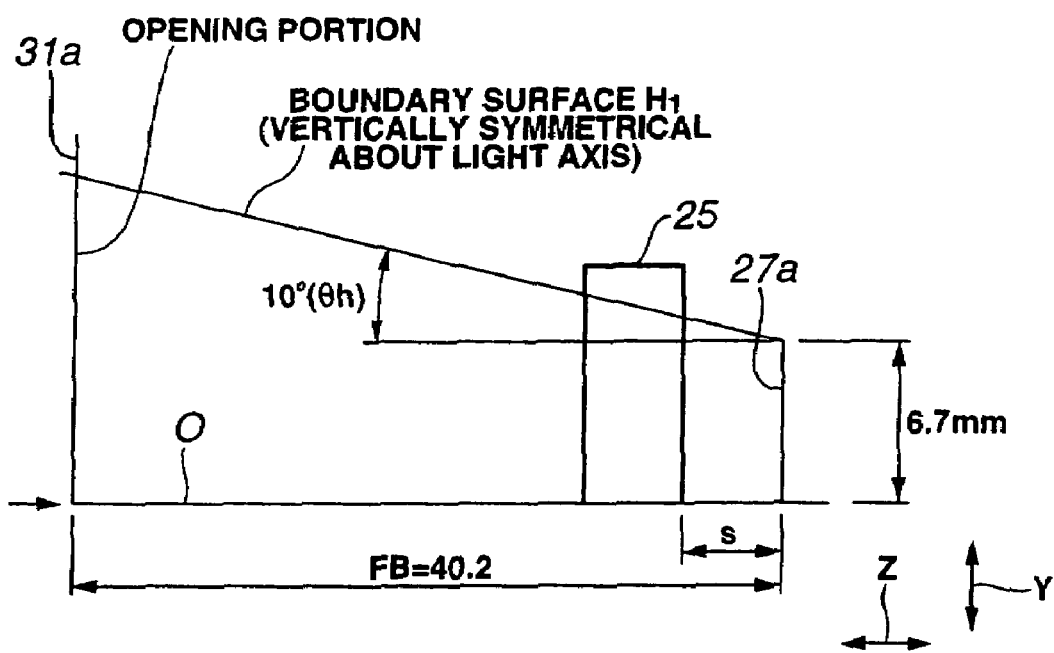
FIG. 13B shows a light beam diagram of a section along a ZY surface (vertical surface) between a photoelectric conversion surface of the image pickup device and the mount opening portion in the digital camera in FIG. 12.

In the digital camera according to this embodiment, for setting a form of the mount opening, four segments extended to the opening portion position spaced by the flange back FB so as to be away from the optical axis O by the angle θh of inclination of about 10 degrees in a direction (Y-direction) along the short side and the angle θw of inclination of about 8 degrees in a direction (X-direction) along the long side from four corners of the imaging range Ri of the photoelectric conversion surface 27a of the image pickup device inscribing an image circle Ic as shown in FIGS. 12, 13A and 13B, that is, an upper left segment, an upper right segment, a lower left segment and a lower right segment are Sd1, Sd2, Sd3 and Sd4, respectively. A square obtained by connecting the lens side front ends of the segments is a minimum mount opening range Rm'.

The mount opening of the camera body side may be set so as to satisfy the minimum mount opening range Rm'. The minimum mount opening range Rm' is set in accordance with the maximum light beam interchangeable lens having the widest outmost light beam of an exit luminous flux among interchangeable lenses of the camera system.

On the other hand, the minimum mount opening range of the interchangeable lens side may be set in order not to block the outermost light beam of the exit luminous flux of each interchangeable lens. However, the mount must have a predetermined form to be mounted to the camera body in order to be compliant as a camera system. The lens side mount opening portion will be described with reference to the maximum light beam interchangeable lens, for example.

In other words, a first plane obtained by tilting the long side of the imaging range Ri by 10 degrees in a direction (Y-direction) away from the optical axis O and extending the long side to the position of the opening portion is called plane H1. A second plane obtained by tilting the short side of the imaging range Ri by 8 degrees in a direction (X-direction) away from the optical axis O and extending the short side to the position of the opening portion is called plane H2. The plane H1 is a plane (boundary plane shown in FIG. 13B) provided between the segment Sd1 and the segment Sd2 or between the segment Sd3 and the segment Sd4. The plane H2 is a plane (boundary plane shown in FIG. 13A) provided between the segment Sd1 and the segment Sd3 or between the segment Sd2 and the segment Sd4. The square established by the lens-side front four sides of the planes H1 and H2 is called minimum mount opening range Rm'.

The square Rm' is within a circumscribed circle of the square formed by connecting ends of the segments tilted by a predetermined angle θ3 (see FIG. 12) in direction away from the four corners of the imaging range Ri with respect to the optical axis and extended to the opening portion. Thus, the imaging range Ri is within the valid pixel range with the aspect ratio of 4:3. Therefore, the angle θ3 can be equal to the tilting angle θ according to the first embodiment and can be set so as to satisfy the condition below:

$$12 \text{ degrees} \leq \theta 3 \leq 14 \text{ degrees}$$

The circumscribed circle of the mount opening range Rm' is Im', and the lens side mount opening portion 31a of the maximum light beam interchangeable lens can have the minimum opening portion. The body side mount opening portion 41a has a size equal to the size of the mount opening range Rm' or larger. The space within the mirror box 42 and surrounded by the four planes H1 and H2 formed by four segments Sd1, Sd2, Sd3 and Sd4 contains nothing (reflector 13b and shutter frames) to block object luminous flux in shooting.

A main light beam of a peripheral light beam parallel to the optical axis can be adapted up to AV 3.6 (equal to adaptive F No. 3.5) at the end of the mount opening range Rm' in the long side direction and up to AV 3 (equal to adaptive F No. 2.8) at the end in the short side direction. Therefore, when a lens with F No. 1.4 is used as an interchangeable lens barrel, the amount of light falls by 2.6 levels at the end in the long side direction and by 2 levels at the end in the short side direction. However, as described above, the lens barrel with F No. 1.4 may be a wide angle lens barrel, and the main light beam of a peripheral ray beam tilts with respect to the optical axis O. When the above illustrated lens barrel is used, the amount of light falls by about 1.2 levels at the end in the long side direction and by about 0.8 levels at the end in the short side direction, which are practically not a problem. On the other hand, when a telephoto lens barrel causing a peripheral luminous flux with a main light beam substantially parallel to the optical axis is used, the F No. is 2 to 2.8 (equal to AV 2 to 3). Therefore, the telephoto lens barrel can be used with no problems.

When a digital camera according to this embodiment is used, the reference mount diameter Dm of the circumscribed circle Im of the minimum mount opening range Rm' depends on the distance (flange back FB) from the imaging surface to the opening portion. However, in consideration of the existence of the mirror box 42 between the image pickup device 27 and the body side mount portion 47, the relationship between the reference opening diameter Dm and the image circle Di is desirably set so as to satisfy:

$$Dm/Di \geq 1.8$$

In a digital camera according to this embodiment, a connecting terminal for electric connection between the camera body and the interchangeable lens barrel may be provided outside of the square of the mount opening range Rm' and is desirably provided outside of the square and inside of the circumscribed circle Im' of the square.

The mirror box 42, the front panel 41, and the body side mount portion 47 and so on are provided between the image pickup device 27 and the interchangeable lens 12, as shown in the section diagram in FIG. 3, in the camera body shown in FIG. 2. Therefore, in order to apply this embodiment to the camera body shown in FIG. 2, the opening portions of these members must satisfy the mount opening range Rm' in the positions in the optical axis direction where the openings are provided.

Next, a digital camera system according to a third embodiment of the invention will be described with reference to FIG. 14 and so on.

Figure 14:
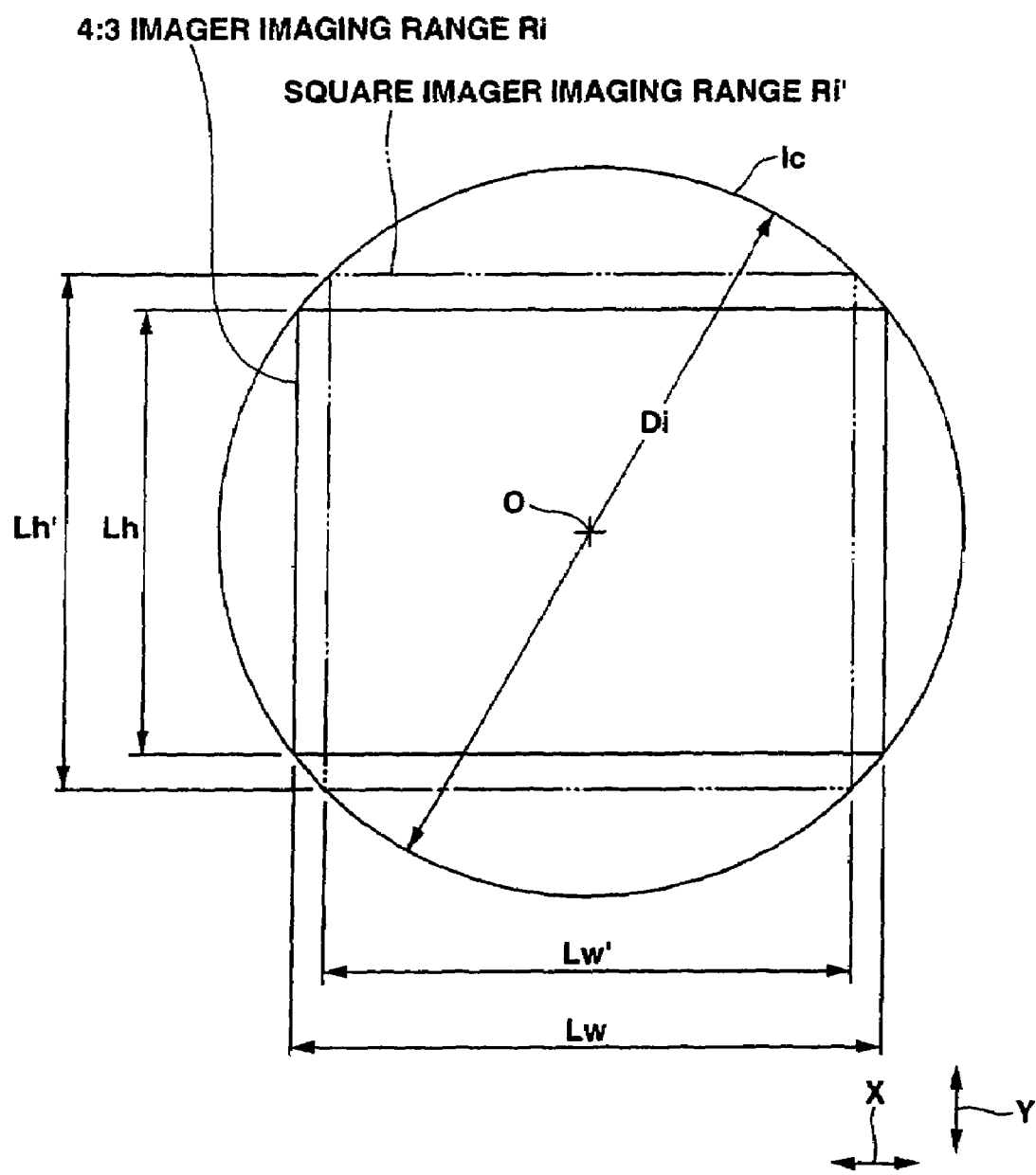
FIG. 14 is a diagram showing an imaging range of a 4/3 type image pickup device and the image circle on an imaging range of a square type image pickup device applied in a digital camera according to a third embodiment of the invention.

FIG. 14 is a diagram showing an imaging range of a 4/3 type image pickup device and the image circle on the imaging range of a square image pickup device applied to this embodiment.

In an interchangeable lens type digital camera according to this embodiment, a square image pickup device having an imaging range with the aspect ratio of 1:1 is applied. The mount opening portion of the camera adopts the same shape as the mount opening shape adopted to the digital camera according to the second embodiment.

The other construction is similar to that of the digital camera according to the first or second embodiment, and the same reference numerals are given to the same components in the description below.

An image pickup device applied to the camera body of the digital camera according to this embodiment is a square image pickup device as described above. The image circle Ic, which is a circumscribed circle of the imaging range Ri' (an area Lw'×Lh': valid screen range) of the photoelectric conversion surface has the same diameter as that of the image circle corresponding to the imaging range Ri of the image pickup device 27 with the aspect ratio 4:3 applied to the digital camera according to the second embodiment. Therefore, the mount opening of the camera according to this embodiment is the same as the mount opening range Rm' (FIG. 12) set based on the imaging range Ri of the image pickup device 27, like the camera according to the second embodiment.

In other words, as shown in FIGS. 12, 13A and 13B, the minimum mount opening of the mount opening range Rm'

(the circumscribed circle Im') is a square formed by connecting lens side ends of four segments Sd1 extended by a flange back FB dimension from four corners of the imaging range Ri of the photoelectric conversion surface 27a of an image pickup device inscribing the image circle Ic in a direction apart from an optical axis by the tilting angle θw of about 10 degrees in a direction (Y-direction) along the short side and by the tilting angle θw of about 8 degrees in a direction (X-direction) along the long side.

The 4/3 type image pickup device (image pickup device) 27 is replaced by a square type image pickup device, and the square type image pickup device is mounted to the camera body having the opening portion of the mount opening range Rm' to which the interchangeable lens barrel 12 according to the second embodiment designed for the 4/3 type image pickup device. Then, differences in amount of entering light by the outputs of the image pickup devices were measured. Table 1 below shows results of the measurement of amounts of reduction in EV value of the amounts of peripheral light with respect to the amount of center light between the 4/3 type image pickup device and the square type image pickup device at peripheral positions (on the short side, long side and diagonal line).

TABLE 1

| | SHORT SIDE | | |
|---|---|---|---|
| ZOOMING STATE | 4:3 IMAGE PICKUP DEVICE | SQUARE IMAGE PICKUP DEVICE | DIFFERENCE |
| WIDE | −0.203 | −0.293 | −0.09 |
| STANDARD | −0.133 | −0.179 | −0.046 |
| TELE | −0.148 | −0.174 | −0.026 |

| | LONG SIDE | | |
|---|---|---|---|
| ZOOMING STATE | 4:3 IMAGE PICKUP DEVICE | SQUARE IMAGE PICKUP DEVICE | DIFFERENCE |
| WIDE | −0.396 | −0.278 | −0.118 |
| STANDARD | −0.216 | −0.179 | −0.037 |
| TELE | −0.249 | −0.174 | −0.075 |

| | DIAGONAL | | |
|---|---|---|---|
| ZOOMING STATE | 4:3 IMAGE PICKUP DEVICE | SQUARE IMAGE PICKUP DEVICE | DIFFERENCE |
| WIDE | −0.963 | −0.963 | 0 |
| STANDARD | −0.883 | −0.883 | 0 |
| TELE | −1.003 | −1.003 | 0 |

As shown in Table 1, the difference in amount of reduction in EV value of the amount of peripheral light with respect to the amount of center light between the 4/3 type image pickup device and the square image pickup device is about ±0.1 EV, which is practically not a problem. Therefore, only by attaching the square type image pickup device to the camera body according to the second embodiment instead, the digital camera body according to this embodiment can be a digital camera body having the aspect ratio of 1:1 compliant with the interchangeable lens barrel having the F number applied in the second embodiment.

Cameras having various specifications may be applied in an interchangeable lens type digital camera system. Therefore, cameras can have imaging ranges with different aspect ratios even having the same image circle. Especially, even when an image pickup device with the aspect ratio of 1:1 is mounted to the camera system according to this embodiment, the length-to-width concept of the camera no longer exists. In this case, when a screen with an arbitrary aspect ratio is trimmed and is read from the imaging range, the direction for holding a camera does not have to be changed for vertically long pictures and horizontally long pictures. Thus, the usability can be improved.

A connecting terminal for electric connection between the camera body and the interchangeable lens barrel in the digital camera according to this embodiment may be provided outside of the square of the mount opening range Rm' and is desirably provided outside of the square and inside of the circumscribed circle Im' of the square.

The present invention is not limited to the above-described embodiments, but various changes can be practically implemented without departing from the principle. Furthermore, the above-described embodiments includes various steps of the invention, and various inventions can be extracted by combining disclosed multiple constructional requirements as necessary.

For example, even when several constructional requirements are removed from the entire constructional requirements according to the embodiments, so long as the problems described in the section, Problems to be Solved by the Invention, can be solved, and the advantages described in the section, Advantages of the Invention, can be obtained, the construction the constructional requirement of which is removed can be extracted as the invention.

What is claimed is:

1. A camera body of digital camera to which an interchangeable lens having a predetermined image circle is removably mounted, the camera body comprising:
   an image pickup device having an imaging surface of an imaging range with a predetermined aspect ratio, the image circle being set larger than the imaging range to include the imaging range therein;
   a mount portion to which the interchangeable lens is mounted;
   an opening portion having an opening for allowing luminous flux from the interchangeable lens to pass through, being located at a position spaced from the imaging surface by a predetermined distance; and
   wherein the size of the opening of the opening portion is equal to or larger than a square formed by connecting ends of segments tilted by an angle θ with respect to an optical axis diagonally from four corners of the imaging range and extended to the opening of the opening portion, and the angle θ satisfies:

12 degrees<θ, wherein the distance between the opening of the opening portion and the imaging surface, herein referred to as flange back (FB), is:

35 mm<FB<50 mm.

2. A digital camera system according to claim 1, wherein the angle θ further satisfies:

θ≦14 degrees.

3. A camera body according to claim 1, further comprising a connecting terminal provided in said mount portion in an area outside of a square formed by connecting ends of the segments and within a circumscribed circle of the square.

4. A camera body according to claim 3, wherein the connecting terminal is electrically connected to a terminal provided in the interchangeable lens when the interchangeable lens is mounted to the camera body.

5. A camera body according to claim 3, wherein the connecting terminal communicates with the interchangeable lens when the interchangeable lens is mounted to the camera body.

6. A camera body according to claim 3, wherein the connecting terminal supplies power to the interchangeable lens when the interchangeable lens is mounted to the camera body.

7. A camera body according to claim 3, wherein the connecting terminal is provided for detecting mounting of the interchangeable lens to the camera body.

8. A camera body according to claim 1, further comprising a connecting terminal provided in the mount portion in an area outside of a plane tilted by 10 degrees in a direction spaced from a long side of the imaging surface with respect to an optical axis and extended to the opening portion and within a circumscribed circle of the square.

9. A camera body according to claim 1, further comprising a connecting terminal provided in the mount portion in an area outside of a plane tilted by 8 degrees in a direction spaced from the short side of the imaging surface with respect to an optical axis and extended to the opening portion and within a circumscribed circle of the square.

10. A camera body according to claim 1, further comprising:
a mirror movable between a position entering into a photographic optical path and an exiting position; and
a mirror box holding the mirror,
wherein the mirror box has an interior of a size which permits passage of luminous flux through an area surrounded by segments tilted by 10 degrees in a direction along a short side and by 8 degrees in a direction along a long side in a direction spaced from four corners of the imaging range with respect to an optical axis and extended to the mount portion, which imaging range is rectangular and the long sides are longer than the short sides.

11. A camera body according to claim 1, wherein a diameter Di of an image circle circumscribing the imaging range of the image surface satisfies:

$21 \leq Di \leq 23$ mm.

12. A camera body according to claim 1, wherein:

$Dm/Di \geq 1.8$ where a diameter of a circumscribed circle of the mount portion opening portion is Dm, and a diameter of an image circle circumscribing the imaging range of the image surface is Di.

13. An interchangeable lens which can be mounted to the camera body set forth in claim 1, the interchangeable lens comprising:
a lens side mount portion for attaching the interchangeable lens to the camera body; and
a lens side opening portion provided in the lens side mount portion and having an opening through which luminous flux can pass for forming an image in the image circle;
wherein the interchangeable lens allows forming of an image in the image circle.

14. A digital camera system having predetermined image circle, the camera system comprising:
a camera body;
an interchangeable lens having a lens side mount portion for attaching the interchangeable lens to the camera body and a lens side opening portion having an opening through which luminous flux can pass for forming an image in the image circle and allowing the forming of the image circle,
the camera body having an image pickup device having an image pickup device having an imaging surface of an imaging range with a predetermined aspect ratio, a body side mount portion located at a position spaced from the imaging surface by a predetermined distance and a body side opening portion having an opening for allowing luminous flux from the interchangeable lens to pass through, the image circle being set larger than the imaging range to include the imaging range therein, wherein a size of the body side opening of the opening portion is equal to or larger than a square formed by connecting ends of segments tilted by an angle θ with respect to an optical axis diagonally from four corners of the imaging range and extended to the opening of the opening portion, and the angle θ satisfies:

12 degree<θ, wherein, the distance between the body side opening of the opening portion and the image surface, hereinafter referred to as flange back (FB), is:

35 mm<FB<50 mm.

15. A digital camera system according to claim 14, wherein the angle θ satisfies:

$\theta \leq 14$ degrees.

16. A digital camera system according to claim 14, further comprising:
a mirror movable between a position entering a photographic optical path and am exiting position; and
a mirror box holding the mirror;
wherein the mirror box has an interior of a size which permits passage of luminous flux through an area surrounded by segments tilted by 10 degrees in a direction along a short side and by 8 degrees in a direction along a long side in a direction spaced form four corners of the imaging range with respect to an optical axis and extended to the mount portion.

17. A digital camera system according to claim 14, wherein a diameter Di of the image circle satisfies:

21<Di<23 mm.

18. A digital camera system according to claim 14, wherein

Dm/Di>1.8 where a diameter of a circumscribed circle of the square is DM, and diameter of the image circle is Di.

* * * * *